US011042016B2

(12) United States Patent
Mertz et al.

(10) Patent No.: US 11,042,016 B2
(45) Date of Patent: Jun. 22, 2021

(54) MULTI-Z CONFOCAL IMAGING SYSTEM

(71) Applicant: TRUSTEES OF BOSTON UNIVERSITY, Boston, MA (US)

(72) Inventors: Jerome Mertz, Newton, MA (US);
Amaury Badon, Brookline, MA (US);
Timothy Weber, Brookline, MA (US);
Sheng Xiao, Allston, MA (US);
Jean-Marc Tsang Min Ching, Brookline, MA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 16/217,791

(22) Filed: Dec. 12, 2018

(65) Prior Publication Data
US 2019/0179127 A1    Jun. 13, 2019

Related U.S. Application Data

(60) Provisional application No. 62/597,638, filed on Dec. 12, 2017, provisional application No. 62/608,058, filed on Dec. 20, 2017.

(51) Int. Cl.
*G02B 21/00* (2006.01)
*G02B 27/10* (2006.01)
(Continued)

(52) U.S. Cl.
CPC .......... *G02B 21/0052* (2013.01); *G02B 5/08* (2013.01); *G02B 21/004* (2013.01);
(Continued)

(58) Field of Classification Search
CPC .. G02B 21/00; G02B 21/002; G02B 21/0024; G02B 21/0032; G02B 21/0036;
(Continued)

(56) References Cited

U.S. PATENT DOCUMENTS

| 7,075,716 B2* | 7/2006 | Borlinghaus | ........ G02B 21/088 359/368 |
| 7,271,953 B2* | 9/2007 | Okugawa | ........... G02B 21/0044 359/368 |

(Continued)

FOREIGN PATENT DOCUMENTS

JP    2014010216 A    1/2014

OTHER PUBLICATIONS

Wang et al., "Non-axial-scanning multifocal confocal microscopy with multiplexed volume holographic gratings" Optics Letters 42:2 346-349 (2017).

*Primary Examiner* — Thong Q Nguyen
(74) *Attorney, Agent, or Firm* — Nixon Peabody LLP; Ronald I. Eisenstein; David F. Crosby

(57) ABSTRACT

A Multi-Z confocal microscopy system can simultaneously record from multiple Z-sections, and thus performs high speed volumetric imaging. An illumination line can be formed by under-filling the illumination beam in the aperture of the microscope objective. The illumination line extends in the Z dimension into the target sample to be imaged and an X-Y scanning mechanism can be used to scan the illumination line over the sample. The detection signal emanating from the scanned sample can be collected through the full numerical aperture of the microscope objective and directed to a detector subsystem. The detector subsystem includes an array of reflecting pinhole detectors and each reflecting pinhole detector is configured to image a volume at a different depth in the sample. This configuration enables reflecting pinhole detector array to image more than one depth volume at the same time.

24 Claims, 19 Drawing Sheets
(8 of 19 Drawing Sheet(s) Filed in Color)

(51) Int. Cl.
  *G02B 5/08* (2006.01)
  *G02B 27/09* (2006.01)
  *G02B 27/14* (2006.01)

(52) U.S. Cl.
  CPC ....... *G02B 21/006* (2013.01); *G02B 21/0032* (2013.01); *G02B 21/0048* (2013.01); *G02B 27/0977* (2013.01); *G02B 27/10* (2013.01); *G02B 27/145* (2013.01)

(58) Field of Classification Search
  CPC .............. G02B 21/0052; G02B 21/008; G02B 21/361; G02B 27/10; G02B 27/104; G02B 27/145; G02B 27/146
  USPC .......................................... 359/368–390, 618
  See application file for complete search history.

(56) References Cited

U.S. PATENT DOCUMENTS

| | | | |
|---|---|---|---|
| 7,724,363 B2 | 5/2010 | Wachsmuth et al. | |
| 8,879,072 B2* | 11/2014 | Langholz | G01N 21/6458 250/205 |
| 9,279,973 B2* | 3/2016 | Takaya | G02B 21/008 |
| 2003/0036855 A1* | 2/2003 | Harris | G02B 21/0028 702/19 |
| 2003/0179372 A1* | 9/2003 | Knebel | G01J 3/1256 356/318 |
| 2006/0152787 A1 | 7/2006 | Knebel et al. | |
| 2007/0057211 A1 | 3/2007 | Bahlman et al. | |
| 2010/0102249 A1* | 4/2010 | Akselrod | G01T 1/10 250/459.1 |
| 2010/0188742 A1* | 7/2010 | Chen | G02B 21/0064 359/385 |
| 2013/0010353 A1 | 1/2013 | Berman | |
| 2014/0008549 A1* | 1/2014 | Theriault | G02B 26/105 250/459.1 |
| 2014/0152793 A1* | 6/2014 | Staker | G02B 21/361 348/79 |
| 2015/0002917 A1 | 1/2015 | Borlinghaus et al. | |
| 2015/0055215 A1* | 2/2015 | Chen | G02B 21/0064 359/386 |
| 2016/0037741 A1 | 2/2016 | Klessig et al. | |
| 2016/0178439 A1* | 6/2016 | Freudiger | G01J 3/44 356/301 |
| 2016/0377412 A1* | 12/2016 | Li | G01N 21/956 356/630 |
| 2016/0377850 A1 | 12/2016 | Anhut et al. | |

* cited by examiner

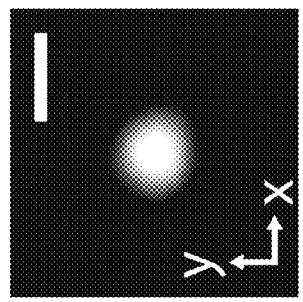
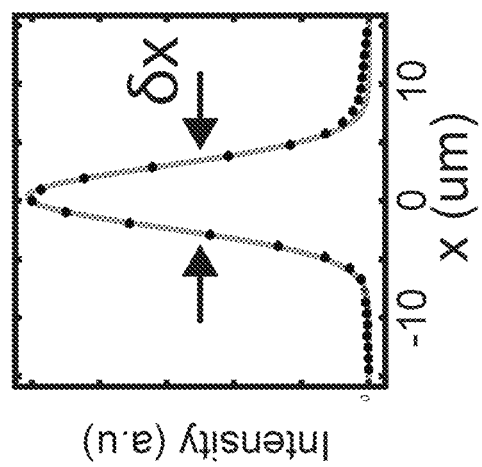
FIG. 11A
FIG. 11B
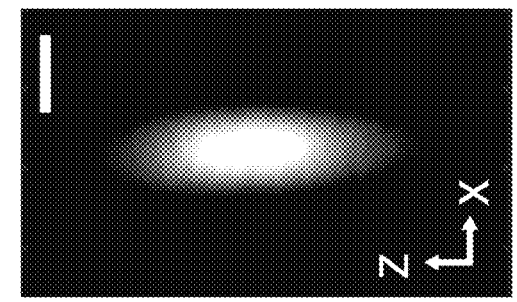
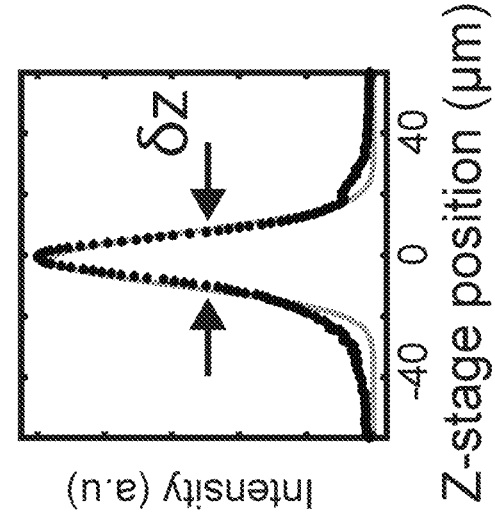
FIG. 11C
FIG. 11D

MULTI-Z CONFOCAL IMAGING SYSTEM

CROSS-REFERENCE TO RELATED APPLICATIONS

This application claims any and all benefits as provided by law including benefit under 35 U.S.C. § 119(e) of the U.S. Provisional Application No. 62/597,638, filed Dec. 12, 2017 and No. 62/608,058, filed Dec. 20, 2017, the contents of both of which are incorporated herein by reference in their entirety.

STATEMENT REGARDING FEDERALLY SPONSORED RESEARCH

This invention was made with government support under grant no. R21EY027549 awarded by the National Institute of Health. The government has certain rights in the invention.

REFERENCE TO MICROFICHE APPENDIX

Not Applicable

BACKGROUND

Technical Field of the Invention

The present invention relates to 3 dimensional confocal imaging systems and more specifically, to a confocal microscope that can simultaneously generate images of multiple Z sections of a sample.

Description of the Prior Art

Confocal microscopy is generally based on a principle of point scanning wherein a beam of light is focused to a point on a sample. The signal produced at this focal point is then projected onto an image plane where a pinhole allows the signal to pass and be detected, while blocking blurred or out-of-focus background signal information. In this configuration, the focal point and pinhole are said to be "conjugate" to one another. Generally, scanning is performed in the transverse X-Y plane to form a 2D image. 3D imaging is then obtained by sequentially acquiring a stack of images displaced in the axial Z direction. In most cases, the light beam is scanned, though alternatively, the sample could be scanned as well. Light scanning is usually preferred because it is faster, and perturbs the sample less.

One advantage of confocal microscopy over standard camera-based microscopes is that it prevents out-of-focus background and foreground from being detected. As a result, it provides true 3D resolution, and optical sectioning (i.e. a capacity to detect signal arising from a single axial section at a time). One disadvantage of confocal microscopy is that it is slow, since images must be constructed point by point. The fastest point-scanning confocal microscopes commercially available are "video rate", meaning they acquire transverse images at rates of about 30 fps (frames per second), corresponding to about 33 ms per frame. While this is often adequate for 2D imaging, it may be unacceptably slow for 3D imaging, since 3D volumetric imaging requires additional scanning in the axial dimension. In other words, volume imaging can only occur, at best, at rates of 30 fps/Nz, where Nz is the number of axial (e.g., Z dimension) sections required per volume. For biological imaging, this rate is often too slow.

SUMMARY

There is considerable interest in developing microscopes that can perform ultrafast volumetric imaging. Some applications include functional brain imaging where neurons are distributed in 3D space and the practitioner would like to monitor the activity of these neurons as fast as possible. The state-of-the-art fluorescent indicators that report calcium activity have response times in the 100 ms range and indicators that report voltage activity are even faster, responding in the 10 ms range. For example, in the latter case, it would be desirable to perform volumetric imaging at 100 vps (volumes per sec). Preferably, such imaging should occur over large volumes with dimensions on the scale of millimeters, so as to monitor extended populations of neurons. The present invention is directed to a microscope herein referred to as a Multi-Z confocal microscope (or MZ-confocal). In accordance with some embodiments of the invention, the Multi-Z confocal microscope can involve scanning a sample with an illumination line extending in the Z dimension over a 2D field (e.g., in the X and Y dimensions) to simultaneously generate two or more layers that make up an image volume. In accordance with some embodiments of the invention, the Multi-Z confocal microscope can involve scanning a sample with a rectangular sheet or window extending in the Y (or X) and Z dimensions over a field (e.g., in the X or Y dimension) to simultaneously generate two or more layers that make up an image volume.

In accordance with some embodiments of the invention, an illumination source generates an illumination or excitation beam that is focused to an illumination line that extends in the Z dimension (rather than a point commonly used in conventional confocal microscopes). The illumination or excitation beam can be focused to an illumination line extending in the Z dimension by weakly focusing the beam by under-filling the back aperture of a microscope objective such that the illumination focus has a small numerical aperture (NA). Such a construction would be contrary to that used in a conventional confocal microscope where the goal is to obtain as tight a focus as possible of the illumination point and would result in poor axial resolution.

In accordance with some embodiments of the invention, the axial resolution of the Multi-Z confocal microscope is provided by the detection optics, not the illumination beam. In the Multi-Z confocal microscope according to some embodiments of the invention, the signal is collected through the full aperture of the aperture microscope objective. This provides another difference between embodiments of the present invention and conventional confocal microscopes where the illumination and detection numerical apertures are the same or similar.

In accordance with some embodiments of the present invention, the detected signal can be split into multiple signals through the use of a novel detector system that splits the detected signal into multiple signals corresponding to different depths in the sample without significant signal loss. The detector system according to some embodiments of the invention can include two or more reflecting pinholes (e.g., positive or negative reflecting pinholes), that send the conjugate image to a detector, such as a photodiode, avalanche photodiode, photomultiplier tube. The reflecting pinholes can be arranged such that each images (allows for the projection of a conjugate image of) a different depth within the sample on to the detector. Preferably, the reflecting pinholes are arranged and aligned so as to define probe volumes that fully span the illumination line focused in the Z dimension. A small overlap in the probe volumes can be provided to avoid gaps in the detection. In accordance with some embodiments of the invention, the Multi-Z confocal microscope can use a series of reflecting pinholes, where in the first reflecting pinhole is configured to capture and image the deepest probe volume and any out of focus signal that is not captured or selected by the first pinhole is sent on to the next reflecting pinhole which images the next shallower probe volume. Any remaining out of focus signal is either reflected or transmitted along to the next reflecting pinhole and each successive pinhole is used to capture and image succeeding shallower probe volumes, thus minimizing signal loss. The detectors can be connected to a computer system that collects the pixel image data and constructs an image volume or 3 D image of the sample from the pixel image data.

In accordance with some embodiments, the illumination line that extends in the Z dimension can be focused or formed to a line that also extends in the X or Y dimension, forming a sheet or a window that can be scanned in the Y or X dimension, respectively. In this embodiment, reflecting slits (e.g., positive or negative reflecting slits) are used instead of reflecting pinholes, and the detectors can extend in the X or Y dimension and consist of line cameras or frame cameras to record the image data. The detector line and/or frame cameras can be connected to a computer system that collects the line image data and constructs an image volume or 3 D image of the sample from the line image data.

In accordance with some embodiments of the invention, a negative reflecting pinhole can be defined to be a small transmitting aperture surrounded by a larger reflecting surface and a negative reflecting slit can be defined to be a narrow transmitting slit flanked by reflecting surfaces on either side or all around. In a negative reflecting pinhole or slit configuration, the light associated with a probe volume passes through the aperture (e.g., the pinhole or slit) to the detector and the light corresponding to other probe volumes can be reflected to the next reflecting pinhole or slit. In accordance with some embodiments of the invention, a positive reflecting pinhole can be defined to be a small reflecting aperture surface surrounded by a larger transmitting space and a positive reflecting slit can be defined to be a narrow reflecting slit flanked by transmitting spaces on either side or all around. In a positive reflecting pinhole configuration, the light associated with a probe volume is reflected by the aperture surface (e.g., the pinhole or slit) to the detector and the light corresponding to other probe volumes can be transmitted through the transmitting spaces of the reflecting pinhole or slit to the next reflecting pinhole or slit. In either configuration, the light transmitted through or reflected by a reflecting pinhole or slit can be further reflected (e.g., by a mirror) or focused (e.g., by a lens) before it is received by a detector.

In accordance with some embodiments of the invention, the Multi-Z confocal imaging system can include an X and Y dimension scanning mechanism that is used to scan the illumination beam (e.g., and the line extending in the Z dimension) over the X and Y dimensions that define the target space of the sample to be imaged. In accordance with some embodiments of the invention, the system can include one or two galvanometric mirrors that are controlled to scan the illumination beam over the sample. Lenses between the illumination source and the microscope objective can be used to focus the illumination beam and ensure that the illumination beam under-fills the back aperture of the microscope objective. The system can be configured such that the detection signal emanating from the sample is directed to retrace the path of the illumination beam to enable the X and Y dimension scanning mechanism (e.g., the galvanometric mirrors) to "descan" the detection signal beam. A beamsplitter can be used to redirect the detection signal beam toward the reflecting pinhole based detector system and one or more focusing lenses can be used to focus the detection signal beam on each of the reflecting pinholes or slits whereby an associated detector images a predefined depth into the sample.

The systems according to the invention provide for simultaneous imaging of multiple planes in the Z dimension such that the volume imaging rate is the same as a single-frame rate and each plane is optically sectioned, meaning it is devoid of out-of-focus background light. Optical sectioning can be performed by physical rejection of background light rather than numerical rejection (such as in structured-illumination techniques), which provides improved image contrast and SNR. Light detection can be performed using the full NA of the microscope objective and without loss of light at the pinholes (or slits) enabling maximum light collection efficiency. In addition, the invention is scalable such that more Z plane images can be added by using more pinholes (or slits) and more detectors. And this can provide increased axial (Z axis) resolution and/or increased depth of field.

Preferably, the illumination and detection are normal to the sample surface (i.e. the imaging geometry is standard). The system according to the invention can provide fast imaging over exceptionally large volumes. For example, the volume can be 1.3 mm×1.3 mm×0.1 mm, and can easily be larger. The invention provides configuration flexibility, for example, the imaging resolution can easily be adjusted by changing the pinhole size or slit width. For example, one advantage when imaging large volumes could include lowering the resolution so as to limit the amount of data produced by the system, which can be massive and impractical at high resolutions. In comparison, for example, consider two-photon microscopy is inherently a high-resolution device, and does not allow such flexibility.

Some Multi-Z confocal microscope systems according to the invention can be relatively simple to implement using standard optical components. In addition, most systems according to the invention can work with both fluorescence and non-fluorescence contrast configurations.

These and other capabilities of the invention, along with the invention itself, will be more fully understood after a review of the following figures, detailed description, and claims.

BRIEF DESCRIPTION OF THE FIGURES

The patent or application file contains at least one drawing executed in color. Copies of this patent or patent application publication with color drawing(s) will be provided by the Office upon request and payment of the necessary fee. The accompanying drawings, which are incorporated into this specification, illustrate one or more exemplary embodiments of the inventions and, together with the detailed description, serve to explain the principles and applications of these inventions. The drawings and detailed description are illustrative, and are intended to facilitate an understanding of the inventions and their application without limiting the scope of the invention. The illustrative embodiments can be modified and adapted without departing from the spirit and scope of the inventions.

FIGS. 11A-11D show sample images of sub-diffraction sized beads in order to determine the resolution (graphs) of a sample system according to some embodiments of the invention.

DETAILED DESCRIPTION OF PREFERRED EMBODIMENTS

The present invention is directed to a Multi-Z confocal microscopy system that can image multiple depths into a sample simultaneously. The system includes one or more illumination sources, such as a LASER light source that forms an illumination beam. In accordance with some embodiments of the invention, the system forms an illumination beam that under fills the microscope objective and is focused to an illumination line that extents in the Z dimension (or a sheet or window extending the Z and X or Z and Y dimensions). In accordance with some embodiments of the invention, the system includes an array of reflecting pinholes (e.g., positive or negative reflecting pinholes or a combination thereof) that can be arranged and configured to image the different depths into the sample that were illuminated by the illumination line extending in the Z dimension. In accordance with some embodiments of the invention, the system can further include an X and/or Y scanning mechanism that is configured and/or controlled to scan the illumination beam and the illumination line over a predefined target area of the sample to be imaged and to "descan" the detection signal beam received from the sample through the system and focus the detection signal beam on the pinhole detector array. In accordance with some embodiments of the invention, the system can further include an array of pinhole detectors, each arranged and configured to image different depths within the sample. In accordance with some embodiments of the invention, the pinhole detectors can include a series or array of reflecting pinholes that split the detection signal into multiple signals corresponding to images at different depths within the sample.

Figure 1:
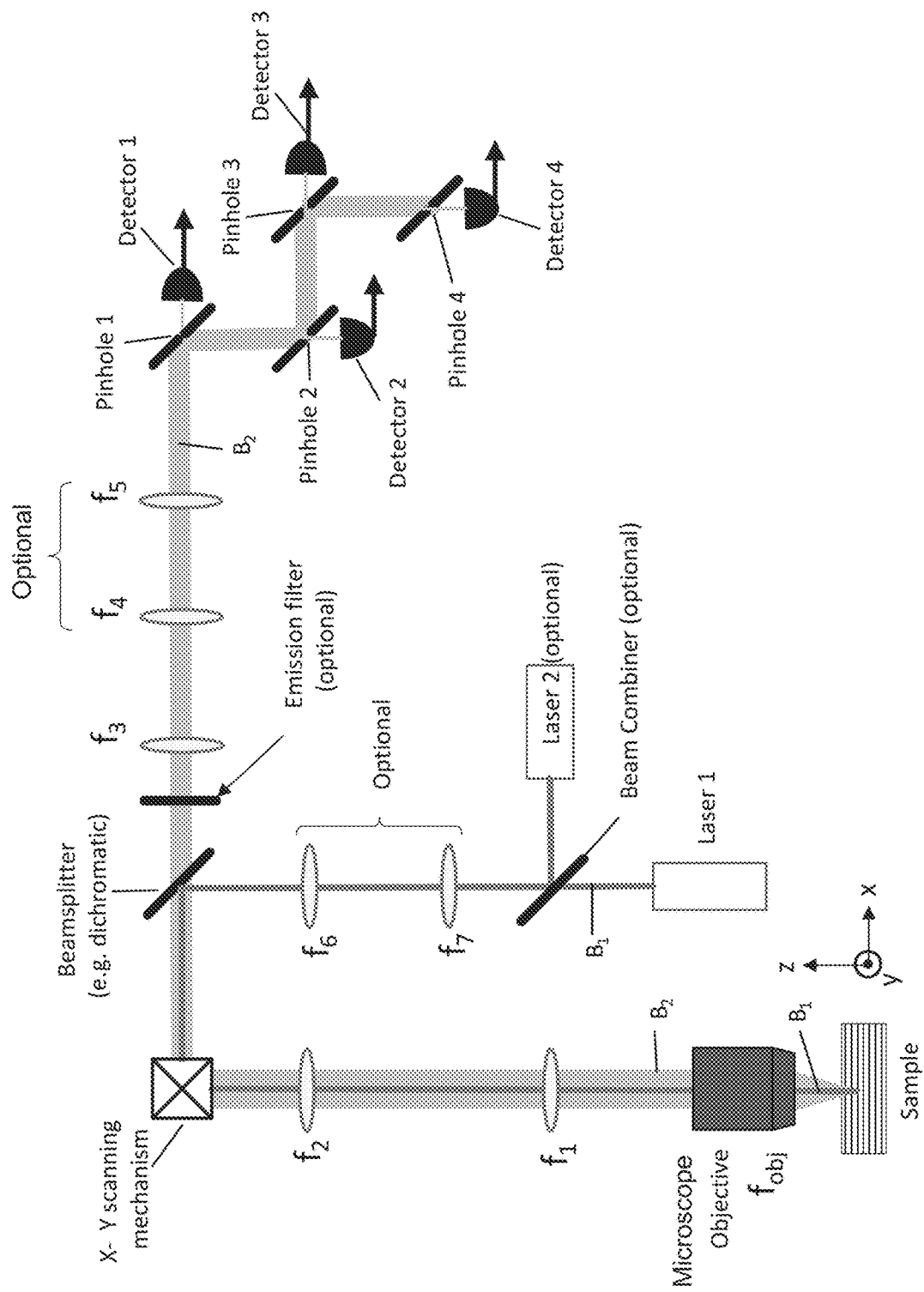
FIG. 1 shows a block diagram of a Multi-Z confocal microscopic imaging system according to some embodiments of the invention.

FIG. 1 shows a diagrammatic example of a Multi-Z confocal microscopy system according to some embodiments of the invention. The system can include at least one LASER light source (e.g., Laser 1 and/or Laser 2) that produces an illumination beam $B_1$ that can be focused by focusing optics (e.g., including tube lens $f_1$, scan lens $f_2$, and lenses $f_6$ and $f_7$) and the microscope objective onto the Sample. The focusing optics focus the illumination beam $B_1$ such that it has a small beam width or diameter and under fills the back aperture of the microscope objective. In this configuration, the microscope objective focuses the illumination beam $B_1$ into an illumination line that extends in the Z dimension and can be configured to extend a predefined length. The length of the illumination line can be in a range from less than 10 µm to 1.0 mm (or more) and can be adjusted by the focusing optics and the microscope objective lens. In accordance with some embodiments, the width (e.g. X and Y dimensions) of the illumination line can be in the range from 2.5 µm to 100 µm. In some embodiments of the invention, the width of the illumination line is about 5 µm wide (e.g. X and Y dimensions) by 100 µm long (e.g., Z dimension). In accordance with some embodiments, the illumination beam $B_1$ can be focused to a beam width that is in a range from 65% to 0.5% of the back aperture of the microscope objective. For Example, where the back aperture of the objective lens is in the range from 2 to 3 mm, the illumination beam $B_1$ can be focused to 1 mm or less. In accordance with some embodiments, the LASER light source can produce an illumination beam $B_1$ having a beam width of 1 mm or less and then focusing lenses $f_6$ and $f_7$ can be omitted. If an optional second or more LASER light source, such as Laser 2, is provided, an optional beam combiner can be used to combine the second illumination beam with the first illumination beam $B_1$. In accordance with some embodiments, the illumination beam $B_1$ produced by the one or more LASERs light sources can produce light in a frequency range that is selected to excite components (e.g., fluorescent labels or indicators) of the sample causing them to emit electromagnetic radiation as well as or instead of reflecting electromagnetic radiation. In accordance with some embodiments, one or more LASER light sources can be used to provide an illumination component of the illumination beam and one or more LASER light sources can be used to provide an excitation component of the illumination beam. For example, the sample can be configured (e.g., using fluorescent labeling) to fluoresce in response to exposure to an excitation beam of a specific excitation frequency or wavelength (or in a specific frequency or wavelength range). In accordance with some embodiments of the invention, the illumination beam can be any wavelength in visible spectrum (e.g., 380 nm to 750 nm) and/or the ultraviolet spectrum (e.g., 10 nm to 400 nm) and/or infrared spectrum (e.g., 700 nm to 1350 nm) or any combinations or ranges therein (for example: Violet (e.g., 380-450 nm), Blue (e.g., 450-495 nm), Green (e.g., 495-570 nm), Yellow (e.g., 570-590 nm), Orange (e.g., 590-620 nm), and Red (e.g., 620-750 nm)), and monochromatic illumination (e.g., 561 nm, 488 nm). For purposes of this disclosure, references to an illumination beam include a beam configured to excite elements in the sample as well as to illuminate portions of the sample. In accordance with some embodiments of the invention, a dichromatic mirror (e.g., beamsplitter) and/or an emission filter can be used to block any reflected wavelengths of the illumination beam that are reflected by the sample and included in the detection beam.

The illumination sources produce an illumination beam $B_1$ that can be directed through the microscope objective (having a focal length of $f_{obj}$) to the sample. The sample can be mounted on a fixed or movable platform at a predefined location with respect to the microscope objective. In accordance with some embodiments of the invention, the microscope objective can have a focal length in a range from less than 1.0 mm to 10 cm or more, or in the range from 10 to 30 mm, and in some embodiments, 20 mm. In accordance with some embodiments of the invention, the system further includes an X-Y scanning mechanism that can be configured and controlled to scan the illumination beam $B_1$ in the X and Y dimensions over the target portion of the sample to be imaged. The X-Y scanning mechanism can include one or more galvanometric mirrors connected to a computer or controller that controls the movement of the galvanometric mirrors to scan the illumination beam $B_1$ over the target portion of the sample. After the illumination beam $B_1$ is focused on the sample, a detection beam $B_2$ emanates from the sample and is directed back along the same path (as the illumination beam $B_1$) to the X-Y scanning mechanism that descans the detection beam $B_2$ and directs it along the path toward the reflecting pinholes and detectors. The detectors can be connected to a computer system that reconstructs the 3 D volume image from the individual detector signal data. The scanning computer or controller keeps track of the position of the X-Y scanning mechanism to inform the reconstruction computer system of the location of the illumination beam $B_1$ on the sample to aid in reconstruction of the 3 D image. Since each detector can be configured to image at a different depth (e.g., position along the Z dimension) in the sample, the system is able to image multiple depths simultaneously enabling a single scan to produce a full 3 D volume image at higher speeds.

In accordance with some embodiments of the invention, a beam splitter can be used to separate the detection signal beam $B_2$ from the path of the illumination beam $B_1$ and direct the detection signal beam $B_2$ along the detection path toward the detector subsystem. The detector subsystem can include an array of two or more negative reflecting pinhole based detectors (e.g., pinhole 1, detector 1, pinhole 2, detector 2, pinhole 3, detector 3, and pinhole 4, detector 4). Focusing lenses $f_3$, $f_4$ and $f_5$ located along the detection path can be used to focus and/or magnify the width of the detection beam $B_2$ spot to be approximately the same size or slightly smaller than the pinhole. The pinhole (e.g., pinhole 1, pinhole 2, pinhole 3, and pinhole 4) can be negative reflecting pinholes constructed from mirrors either having an actual hole, or removing or masking the reflective surface of the mirror to enable the detection beam $B_2$ to pass through to the detector (e.g., detector 1, detector 2, detector 3, and detector 4). The magnification of the detection beam $B_2$ can be used to define the distance between pinholes that correspond to the detected probe volumes in the illumination line. The distance scales with the square of the magnification. In accordance with some embodiments of the invention, the pinhole diameter can be in the range from 1 μm to 1.0 mm, and preferably in the range from 100 μm to 200 μm. In some embodiments where the illumination beam $B_1$ includes a component intended to excite a portion of the target (e.g., fluorescent labels), the beamsplitter can be dichromatic and optionally, an emission filter can be included to filter out the reflected illumination beam $B_1$ frequency signals, enabling the detection beam $B_2$ containing only the excitation frequencies to pass to the detectors.

In operation, the sample is positioned a predefined distance from the microscope objective. A computer system or a controller can be initiated to control the microscopy system. After the target location is identified and focusing lenses configured to provide the predefined illumination line depth, the LASER illumination can be turned on and the X-Y scanning mechanism can be activated to scan the LASER illumination beam $B_1$ and the illumination line over the target area of the sample. The illumination beam $B_1$ can be directed along the illumination path through focusing optics $f_6$ and $f_7$, directed by a beamsplitter to the X-Y scanning mechanism which directs the illumination beam $B_1$ through scan lens $f_2$ and tube lens $f_1$ and the microscope objective on to the sample. As a result of the illumination line, the sample emanates a detection signal that can include light reflected from the sample or light (e.g., fluorescence) emitted by the sample (or fluorescent labels applied to the sample). The detection signal can be focused into a detection beam $B_2$ and directed back along the illumination path to the X-Y scanning mechanism. The detection beam $B_2$ can be descanned by the X-Y scanning mechanism and directed along the detection path to the detection subsystem. In accordance with some embodiments of the invention, descanning converts the detection beam $B_2$ from a position based signal to a time based signal. The focusing optics $f_3$, $f_4$ and $f_5$ located along the detection path can be used to control the focus and magnification of the detection beam $B_2$ on the pinholes and detectors of the detection system. The detectors are connected to a computer that constructs the 3 D image point by point in a manner similar to that used by a conventional confocal microscope.

Figure 2A:
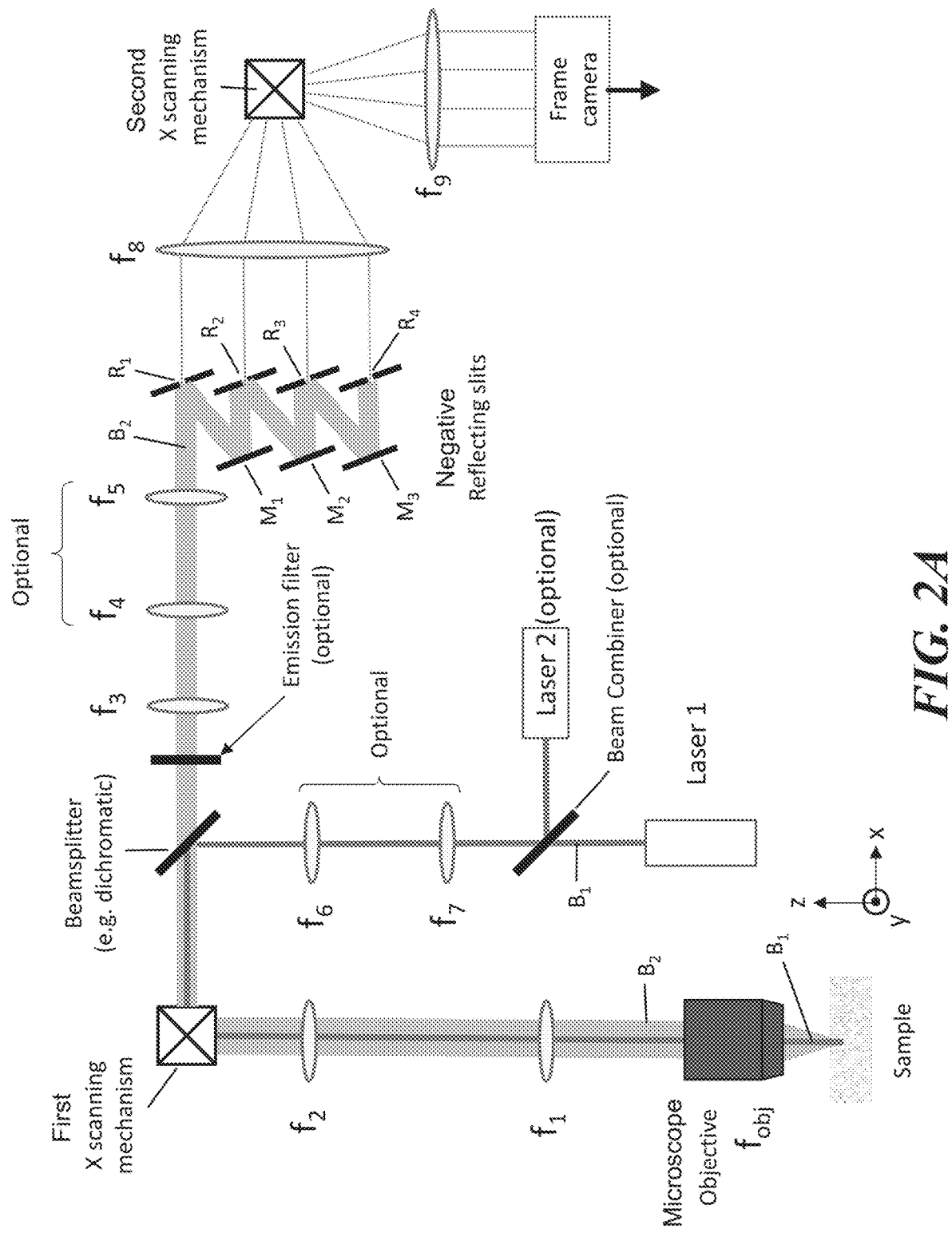
FIG. 2A shows a block diagram of a Multi-Z confocal microscopic imaging system according to some embodiments of the invention.

FIG. 2A shows a diagrammatic example of a Multi-Z confocal microscopy system according to some embodiments of the invention. The system shown in FIG. 2 is similar to the system shown in FIG. 1 except that illumination beam $B_1$ is formed in a line in the X or Y dimension using for example, a cylindrical lens (or diffractive element) and the line is scanned in the Y or X dimension, respectively. The system shown in FIG. 2A includes one or more LASER light sources generating an illumination beam $B_1$ that is directed to the sample by focusing optics $f_6$ and $f_7$, a beamsplitter and a scanning mechanism. In this embodiment, the scanning mechanism (e.g., a single galvanometric mirror or rotating polygonal mirror) only needs to scan in the X (or Y) dimension because the beam is expanded in the Y (or X) dimension. The focusing optics $f_1$, $f_2$, $f_6$, $f_7$ and the microscope objective can be configured to focus the illumination beam $B_1$ into a sheet or a window that extends in the X and Z (or Y and Z) dimensions that can be scanned or swept across in the sample in the Y or X dimension, respectively. The dimensions of the illumination sheet can be in a range from less than 10 μm to 1.0 mm (or more) in the Y (or X) dimension, and in a range from less than 10 μm to 1.0 mm (or more) in the Z dimension which can be adjusted by the focusing optics and the microscope objective lens. In accordance with some embodiments of the invention, the illumination sheet can be 5 μm×1 mm (e.g., X or Y dimension)×100 μm (e.g., Z dimension). In accordance with some embodiments, the illumination beam $B_1$ can be focused to a beam width that is in a range from 65% to 0.5% of the back aperture of the microscope objective. If an optional second or more LASER light source, such as Laser 2, is provided, an optional beam combiner can be used to combine the second illumination beam with the first illumination beam $B_1$. In accordance with some embodiments, the illumination beam $B_1$ produced by the one or more LASERs light sources can produce light in a frequency range that is selected to excite components (e.g., fluorescent labels or indicators) of the sample causing them to emit electromagnetic radiation as well as or instead of reflecting electromagnetic radiation. In accordance with some embodiments, one or more LASER light sources can be used to provide an illumination component of the illumination beam and one or more LASER light sources can be used to provide an excitation component of the illumination beam. For example, the sample can be configured (e.g., using fluorescent labeling) to fluoresce in response to exposure to an excitation beam of a specific excitation frequency (or in a specific frequency range). For purposes of this disclosure, references to an illumination beam include a beam configured to excite elements in the sample as well to illuminate portions of the sample.

As shown in FIG. 2A, the detection beam $B_2$ emanates from the sample through the microscope objective, focusing optics scan lens $f_2$ and tube lens $f_1$ and is descanned by the X scanning mechanism. The X scanning mechanism directs the detection beam $B_2$ along the detection path through the beamsplitter and focusing optics $f_3$, $f_4$, and $f_5$ to the detector subsystem. In this embodiment, the detection beam $B_2$ is elongated in the Y (or X) dimension and the pinholes from the embodiment of FIG. 1 are replaced with reflecting slits configured as described with respect to FIG. 1 and the point detectors can be replaced with line detectors (e.g., line cameras) aligned with the slits. The detector subsystem can include an array of two or more slit based detectors (e.g., $R_1$, $R_2$, $R_3$, and $R_4$). Focusing lenses $f_3$, $f_4$ and $f_5$ located along the detection path can be used to control the focus and/or magnification of the thickness (e.g., X dimension) of the detection beam $B_2$ line to be approximately the same size or slightly smaller than width of the slits (e.g., $R_1$, $R_2$, $R_3$, and $R_4$). The slits (e.g., $R_1$, $R_2$, $R_3$, and $R_4$) can be constructed from mirrors either having an actual slit or slot, or by removing or masking the reflective surface of the mirror to enable the detection beam $B_2$ to pass through to the detector (e.g., a frame camera). The magnification of the detection beam $B_2$ can be used to define the distance between slits that correspond to the detected probe volumes in the illumination sheet. The distance between the slits scales with the square of the magnification. In accordance with some embodiments of the invention, the slit width can be in the range from 1 μm to 1.0 mm, and preferably in the range from 100 μm to 200 μm, and the slit length can be in the range from 10 μm to 10 mm and preferably in the range from 1 mm to 2 mm. In some embodiments where the illumination beam $B_1$ includes a component intended to excite a portion of the target (e.g., fluorescent labels), the beamsplitter can be dichromatic and optionally, an emission filter can be included to filter out the illumination beam $B_1$ frequency, enabling the detection beam $B_2$ containing only the excitation frequencies to pass to the detectors.

In accordance with some embodiments of the invention, the detection subsystem can include focusing lenses $f_8$ and $f_9$ and a second scanning mechanism (e.g. X or Y scanning mechanism), instead of a set of line cameras. In these embodiments, the second scanning mechanism can be coupled to the first scanning mechanism such that the position of the illumination line (or sheet) on the sample corresponds to a corresponding position of the detection beam on the frame camera. In this way, as the illumination line is scanned over the target in the sample, the resulting detection beam can be scanned over a predefined array of camera pixels in the frame camera, enabling the system to produce multiple Z images simultaneously. This enables 3 D images to be produced at high speed.

Figure 5:
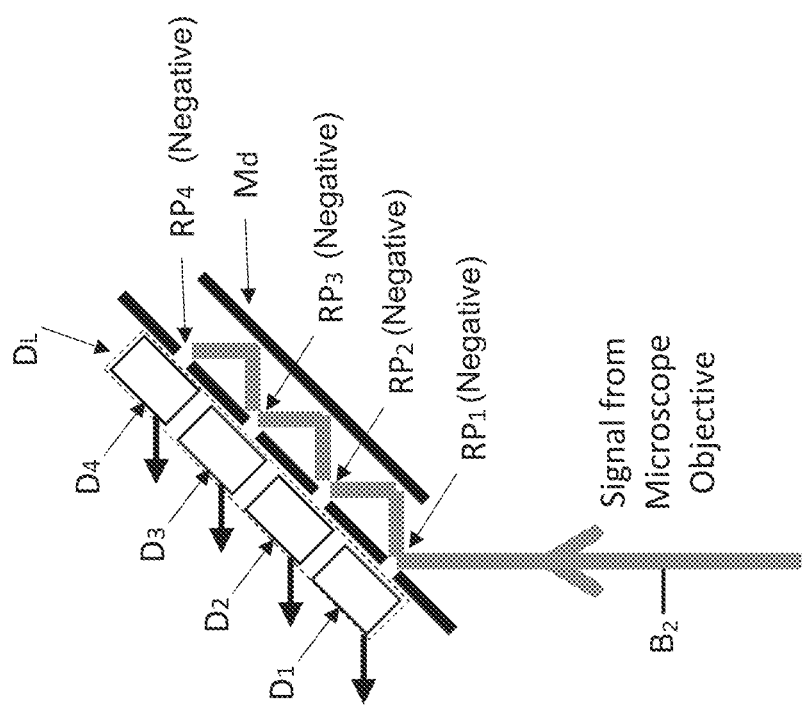
FIG. 5 shows a diagrammatic view of a detector system according to some embodiments of the invention.
Figure 6:
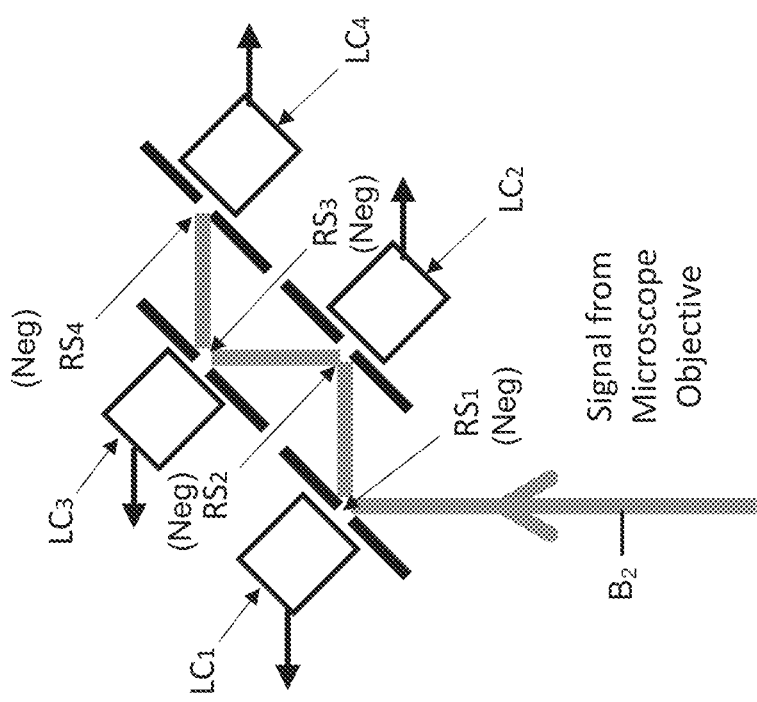
FIG. 6 shows a diagrammatic view of a detector system according to some embodiments of the invention.
Figure 7:
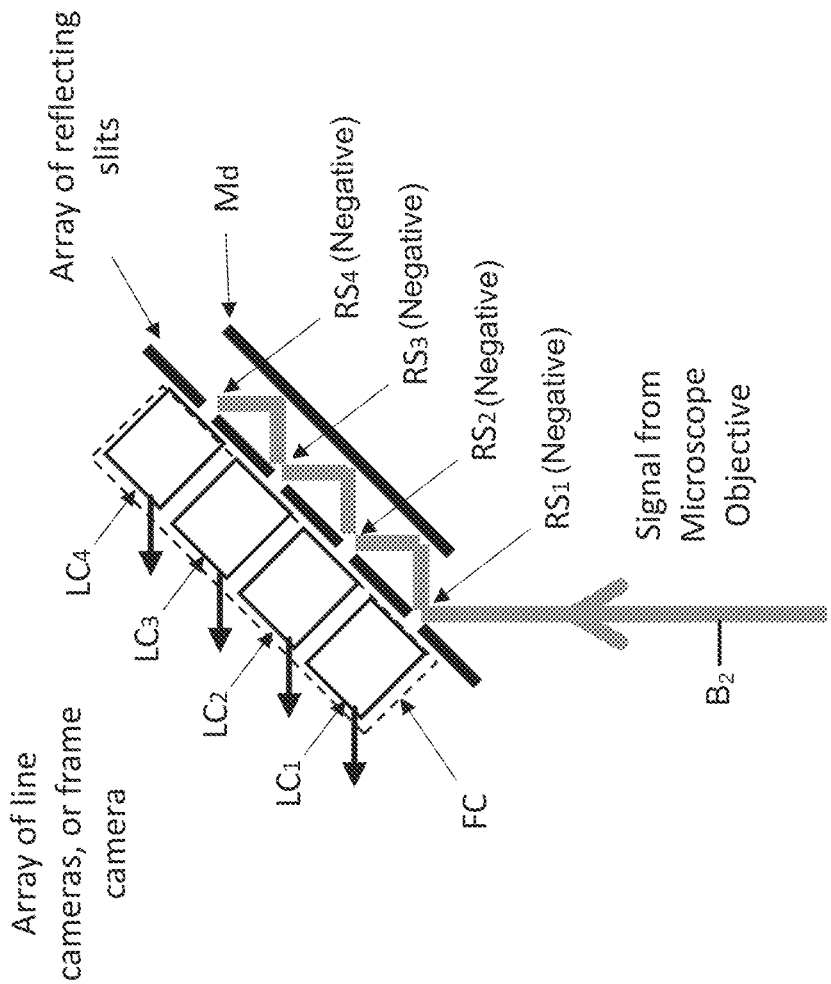
FIG. 7 shows a diagrammatic view of a detector system according to some embodiments of the invention.
Figure 8:
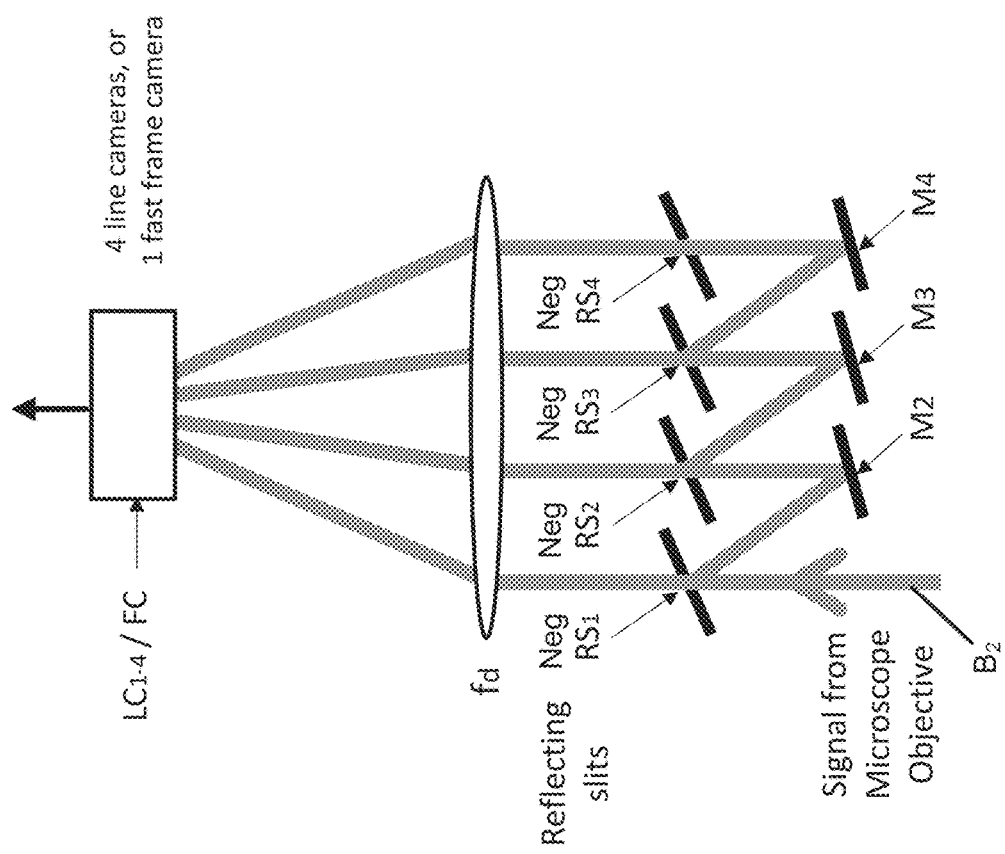
FIG. 8 shows a diagrammatic view of a detector system according to some embodiments of the invention.

In accordance with some embodiments of the invention, the configuration of reflecting pinholes (or slits) can be constructed using either negative reflecting pinholes (or slits) or positive reflecting pinholes (or slits) or a combination of negative reflecting pinholes (or slits) and positive reflecting pinholes (or slits). In accordance with some embodiments of the invention, the detectors can include individual detectors (as shown in FIGS. 1, 3 and 5), line cameras (as shown in FIGS. 6, 7, and 8), and frame cameras (as shown in FIGS. 2A, 2B, 2C, 8 and 9) or a combination thereof, regardless of whether the detector system uses negative reflecting pinholes (or slits), positive reflecting pinholes (or slits) or a combination of negative reflecting pinholes (or slits) and positive reflecting pinholes (or slits).

Figure 2B:
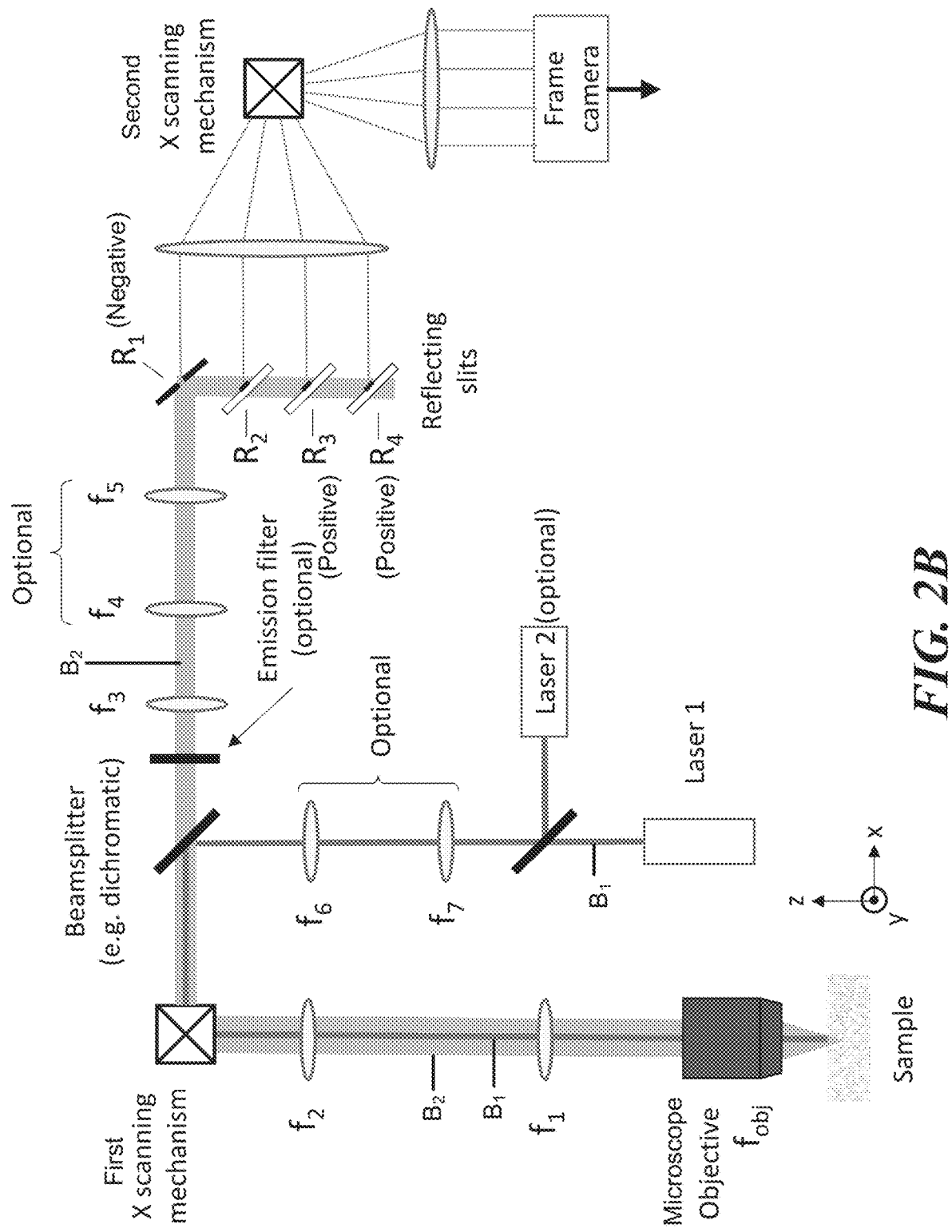
FIG. 2B shows a block diagram of a Multi-Z confocal microscopic imaging system according to some embodiments of the invention.

FIG. 2B shows a diagrammatic example of a Multi-Z confocal microscopy system according to some embodiments of the invention. The system shown in FIG. 2B is similar to the system shown in FIG. 2A except that some of the reflecting slits ($R_1$) are "negative" (i.e. the slit is transmitting while the region surrounding the slit is reflecting), while other slits ($R_2$, $R_3$, $R_4$) are "positive" (i.e. the slit is reflecting while the region surrounding the slit is transmitting).

Figure 2C:
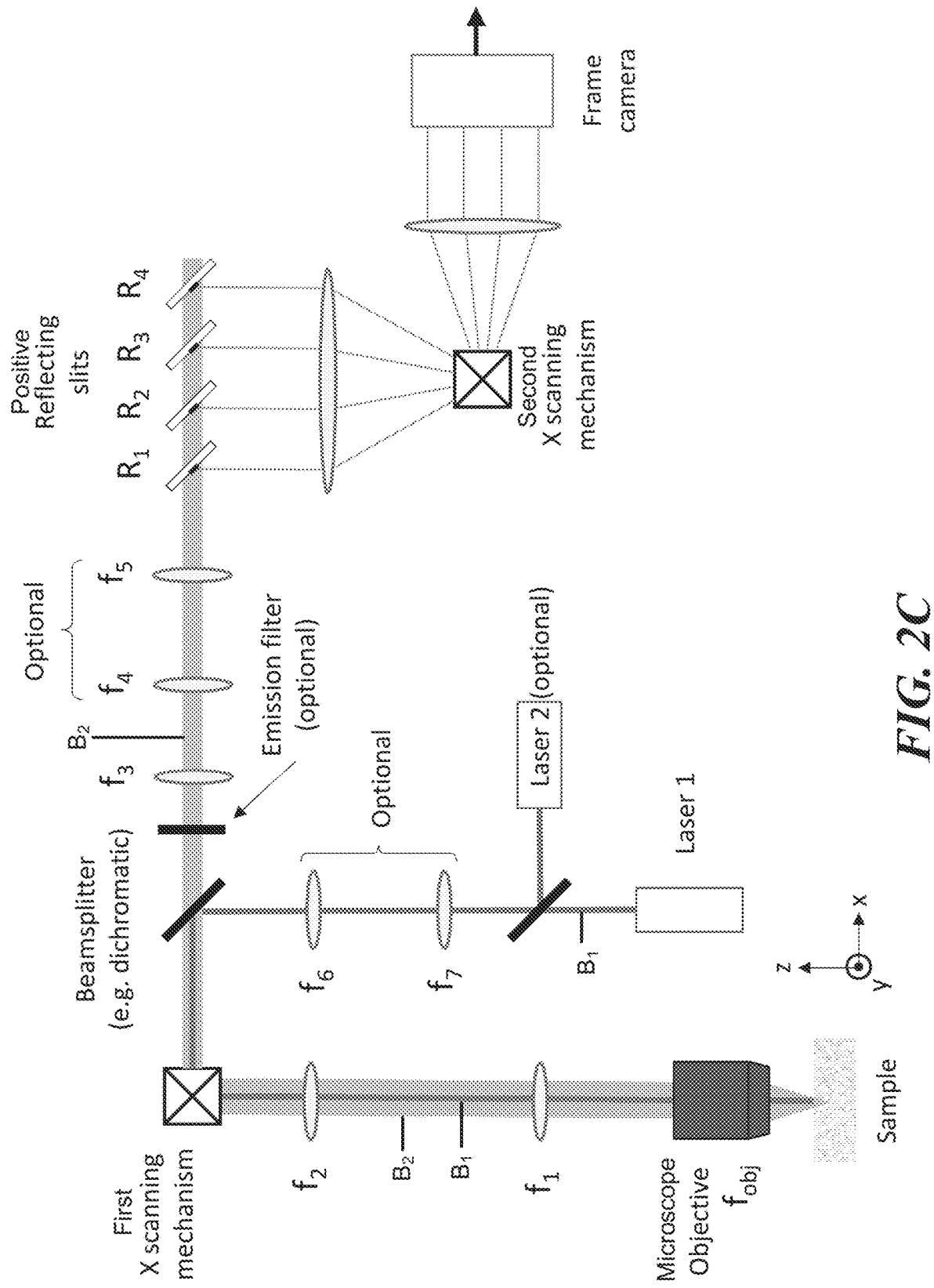
FIG. 2C shows a block diagram of a Multi-Z confocal microscopic imaging system according to some embodiments of the invention.

FIG. 2C shows a diagrammatic example of a Multi-Z confocal microscopy system according to some embodiments of the invention. The system shown in FIG. 2C is similar to the systems shown in FIG. 2A and FIG. 2B except that all of the reflecting slits ($R_1$, $R_2$, $R_3$, $R_4$) are "positive" (i.e. the slit is reflecting while the region surrounding the slit is transmitting).

Figure 3:
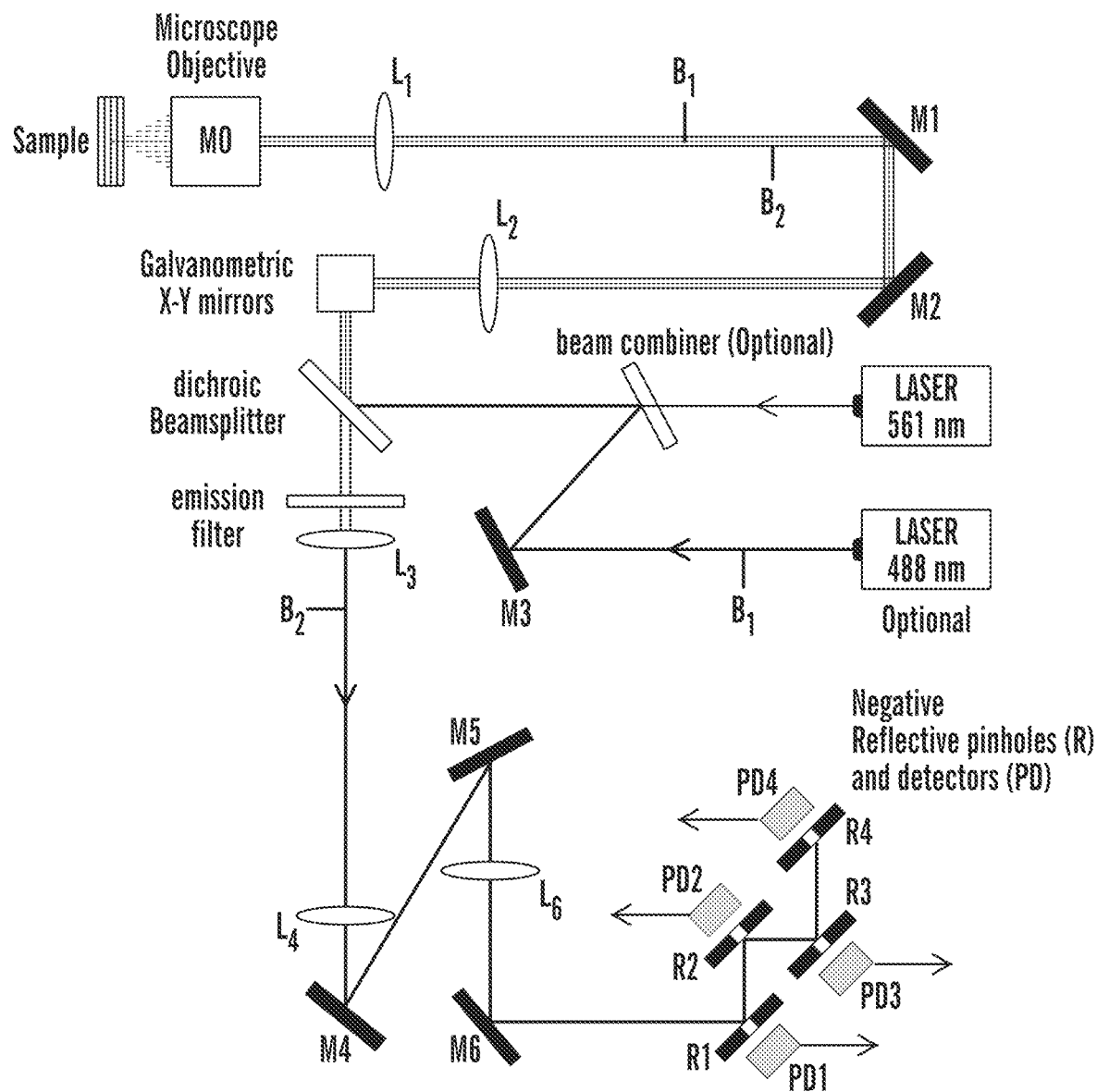
FIG. 3 shows a block diagram of a Multi-Z confocal microscopic imaging system according to some embodiments of the invention.

FIG. 3 shows a diagrammatic example of a Multi-Z confocal microscope system according to some embodiments of the invention. The Multi-Z confocal microscope system shown in FIG. 3 includes a microscope objective, focusing lenses tube lens L1 and scan lens L2 and an X-Y scanning mechanism (e.g., galvanometric X-Y mirrors) that direct one or more illumination beams B1 (produced by one or more LASER light sources) toward a sample. In this embodiment, the LASER light sources produce narrow illumination beams B1 that under fill the back aperture of the microscope objective MO resulting in an illumination line extending in the Z dimension into the sample that can be scanned over the sample. The detection beam B2 that emanates from the sample can be directed back along the illumination path and then directed to the detector subsystem by the beamsplitter. Focusing optics L4 and L6 can be used to control the focus and magnification of the detection beam B2 such that the detection beam B2 fills the pinholes in the reflecting pinholes (e.g., R1, R2, R3, and R4) and passes to the detectors (e.g., PD1, PD2, PD3, and PD4). This embodiment shows that additional mirrors M1, M2 in the illumination path and M4, M5, and M6 in the detection path can be included to change the size and configuration of the system.

Figure 4B:
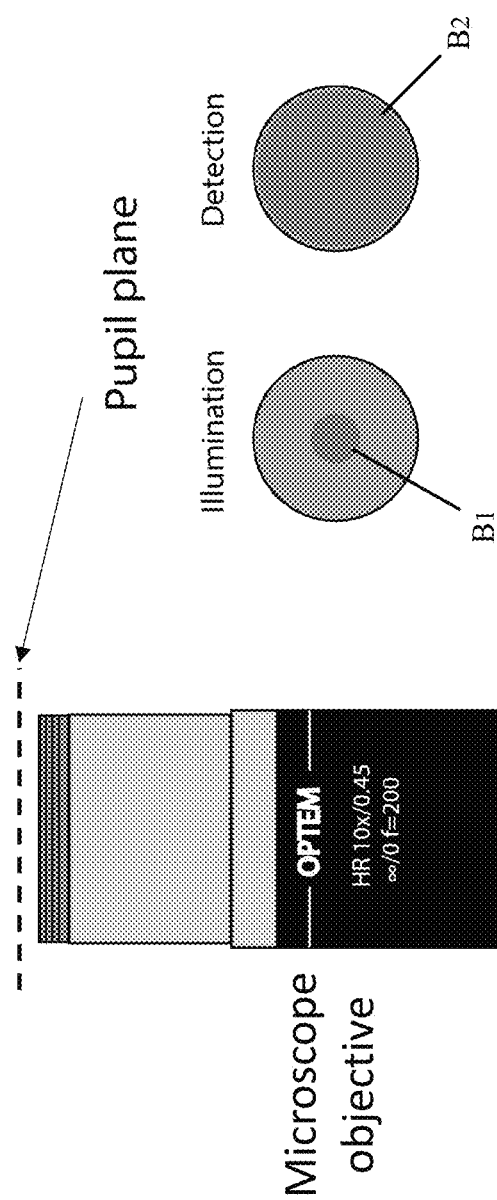
FIG. 4B shows a diagrammatic view of the illumination beam under-filling the NA of the microscope objective and the detection beam filling the full NA of the microscope objective.
Figure 4A:
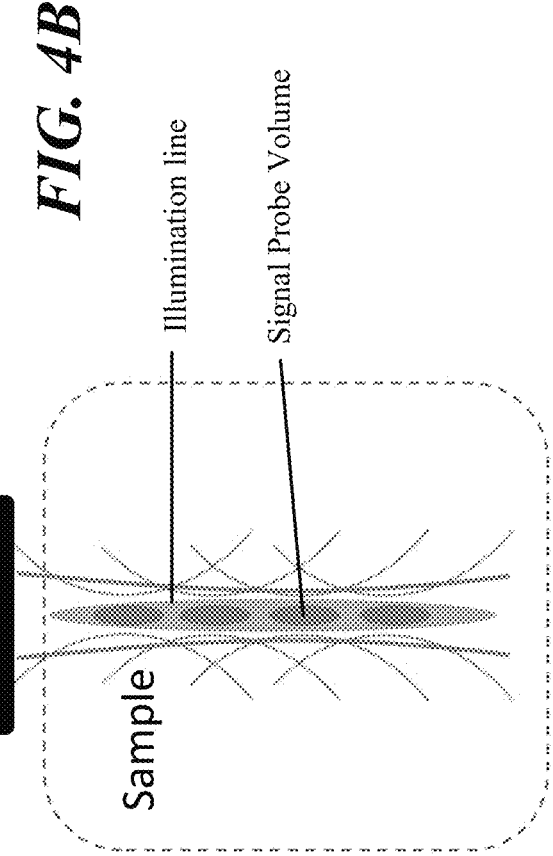
FIG. 4A shows a diagrammatic view of a microscope objective configured to focus the illumination beam into a line that extents in the Z dimension into the sample.

FIG. 4A shows a diagrammatic view of the microscope objective lens demonstrating how the under filled illumination beam B1 produces a line in the Z dimension that can be scanned through the sample to produce the 3 D image. The microscope objective lens can have a 10× magnification, a numerical aperture of 0.45, and a focal length of 20 mm. The resulting illumination line in a Multi-Z confocal microscopy system according to some embodiments of the invention can be approximately 5 μm (X dimension)×5 μm (Y dimension)×100 (Z dimension). The resulting illumination line in a Multi-Z line scan confocal microscopy system according to some embodiments of the invention can be approximately 5 μm (X dimension)×1.0 mm (Y dimension)×100 μm (Z dimension).

The Multi-Z confocal microscope system according to some embodiments of the invention differs from conventional confocal microscopy in several aspects. In one aspect, the illumination focus can be extended in the Z dimension into the sample. In accordance with some embodiments of the invention, a diffractive optical element can be used to focus the illumination beam into a line (e.g. a Bessel beam focus). In accordance with some embodiments of the invention, a holographic element can be used to focus the illumination beam into a line. Alternatively, the illumination beam $B_1$ can be configured to be a narrow beam such that it does not fill the objective back aperture (as it does in standard confocal), but rather under-fills the aperture (e.g., by 65% to 0.5%) as shown in FIG. 4B such that the illumination focus forms a line extending the Z dimension. The numerical aperture or width of the illumination beam can be modified by selecting focusing lenses $f_7$, $f_6$, $f_2$, $f_1$ and the microscope objective to define the length of the illumination line. In accordance with some embodiments of the invention, the numerical aperture associated with the illumination beam $B_1$ can be configured to be different from that of the microscope objective, and is defined as $NA_{ill} < NA_{obj}$. The axial extent of the laser focus (e.g., the illumination line) can be defined by $\Delta Z_{ill} = n\lambda/NA_{ill}^2$, where n is the index of refraction of the sample, $\lambda$ is wavelength of the illumination light and $NA_{ill}$ is the numerical aperture of the illumination beam $B_1$.

With respect to the light emanating $B_2$ from the sample, the detection signal can be collected through the entire numerical aperture of the objective as shown in FIG. 4B. Because of this, the detection signal beam $B_2$ "seen" by the pinhole is less extended (in the Z dimension) than the laser focus. The signal probe volume has an axial extent roughly given by $\Delta Z_{signal} = n\lambda/NA_{obj}^2$. The laser focused illumination line can be longer than the signal probe volume by a factor $N = z_{laser}/\Delta Z_{signal}$. In one example, N=4 (though it could be more or less) and therefore the system can fit four non-overlapping probe volumes within the same extended laser focus. To detect the signals from these four probe volumes, four pinholes can be arranged such that they are conjugate to each of these probe volumes. Since the probe volumes are distributed in Z, the pinholes must also be distributed in Z, such that each probe volume is imaged onto each of the distributed pinholes.

Another difference between Multi-Z and standard confocal microscopy is the nature of the pinholes and collection of signals corresponding to multiple depths (e.g. Z dimension) in sample. Consider, for example, the signal generated from the deepest of the four probe volumes within the sample. In the case of "negative" reflecting pinholes, this signal is detected through the first of the four pinholes in some of the embodiments according to the invention. And the signals generated from the other three probe volumes, which are out of focus relative to this first pinhole, are not transmitted through this pinhole and hence not detected. In standard confocal microscopy, such out-of-focus signal is lost. However, in accordance with Multi-Z microscope systems according to the invention, these out-of-focus signals are not lost because they are reflected downstream by the reflective surfaces of the reflecting pinholes (slits) and detected through downstream pinholes. In accordance with some embodiment of the invention, a signal that is not transmitted through a first pinhole can be reflected and sent to the second pinhole, and so forth, until the signals from all the probe volumes are detected. In this manner, each pinhole receives only the signal generated from its associated probe volume. In addition, these signals are acquired simultaneously and can be used to simultaneously produce four (or more) images from four (or more) different depths, thus enabling high speed Multi-Z confocal imaging. The reflecting pinholes can be made by evaporating a reflecting metal or dielectric coating onto a glass substrate, while masking or otherwise keeping a small aperture within the center of the substrate clear. Alternatively, a reflecting pinhole can be constructed by forming (e.g., by drilling or etching) a physical hole in any reflecting material.

One of the advantages of the present invention is that the signal, a precious commodity (particularly fluorescence signal), is processed very efficiently. In accordance with some embodiments of the invention, the Multi-Z confocal microscopy system collects the detection signal though the entire objective numerical aperture, thus maximizing collection efficiency. In addition, the system does not lose signal at each pinhole stage, since any portion of the detection signal that is not detected by one pinhole detector is sent to subsequent pinhole detectors. It should be noted, for example, that beamsplitters could also be used to route different signals to different non-reflecting (i.e. standard) pinholes, but these would be very inefficient since light would be lost at every pinhole stage.

Preferably, in order to avoid wasting the signal, the probe volumes inside the illumination line of the laser focus should nominally be touching but not overlap. Also, the transverse widths of the probe volume should nominally match that of the illumination line of the laser focus, which itself is given by $\Delta x = \lambda/2NA_{ill}$. Accordingly, the size of the pinholes in the reflecting pinholes of microscopy system should nominally be $\Delta x$ M where, again, M is the magnification of the probe volumes to the pinholes.

In accordance with some embodiments of the invention, the distance between the pinholes should nominally be $\Delta z$ $M^2$, where $\Delta z$ is the distance between the probe volumes along the axial direction in the sample, and again M is the magnification of the probe volumes to the pinholes.

In accordance with some embodiments of the invention, the transverse and axial resolutions of some Multi-Z confocal microscope systems can be lower than the resolutions of a standard confocal microscope. But in many scenarios, this loss in resolution is an acceptable price to pay for the gain in information from multiple depths within the sample at high speeds. For example, biological cells are typically 10 μm or more in size. If one requires only cellular resolution, then Multi-Z confocal microscopy system according to the invention can provide adequate resolution (e.g. 4 um) using standard objectives. Moreover, when imaging over very large fields of view (FOVs) it is often preferable to lower the resolution to avoid accumulating massive amounts of data unnecessarily. Thus, the present invention is particularly well suited for very large FOV imaging applications. This is an advantage, for example, over 2-photon microscopy, where resolution is generally constrained to be very high, thus causing large FOV imaging to be very slow.

Provided there is enough detection signal, the speed limitation for a Multi-Z confocal microscopy system according to the invention is defined by the speed of the scanning mechanism or of the image acquisition electronics of the detector subsystem. Resonant galvanometers or polygonal scanners can easily provide video-rate imaging. For example, if the detectors can detect at a 10 MHz rate, then each detector can produce a 512×512 pixel image at a rate of 38 Hz, which is faster than video rate. Since four or more detectors can be operated simultaneously, the microscope then produces volume images of size 512×512×4 faster than video rate. Faster imaging speeds could be accomplished using faster acquisition electronics or smaller pixel arrays (e.g., 128×128 pixels). Typical FOVs that are accessible by standard scanning mechanisms are in the range of millimeters.

To obtain faster imaging, an alternative embodiment of the Multi-Z confocal microscopy system according to the invention as shown in FIG. 2 can be implemented. In this embodiment of the invention, instead of performing a 2D scan of an elongated laser focus, the system can be configured to perform a 1D scan of an elongated illumination sheet or window. In this embodiment, the laser is elongated along both the y (or x) and z dimensions, and the laser scan is along the x (or y) dimension. This variation is akin to line-scanning in conventional confocal microscopy. The generation of a laser line can be achieved, for example, with a cylindrical lens or diffractive optical element. For this line-scanning variation, the reflecting pinholes can be replaced with reflecting slits (where the orientation of the slits is along the same dimension as the illumination sheet or window). In some embodiments of the invention, the four detectors can be replaced with four line cameras. In some embodiments of the invention, the four line cameras can be replaced with a single frame camera. In some embodiments of the invention, the signals transmitted through the four slits can be "re-scanned" by a second scanning mechanism so that the four line signals are swept across the frame camera surface during a camera exposure. In this manner, the four line signals can produce four images, side by side, within a single camera frame. For example, a standard sCMOS frame camera can perform at frame rates of up to 400 Hz or more when reading frames 512×2048 pixels in size. Each camera frame can then contain four 512×512 images side by side. The Multi-Z line-scanning confocal microscopy system according to some embodiments of the invention can thus provide 512×512×4 volumetric imaging at 400 Hz, which is more than an order of magnitude faster than video rate. In this embodiment, two synchronized scanning mechanisms can be used, for example, two galvanometer-mounted mirrors driven by a common control signal. Alternatively, the two synchronized scanning systems can be two different portions of a single rotating polygonal mirror.

A shown in FIG. 5, the detection subsystem can include two or more reflecting pinholes RP1, RP2, RP3, RP4, each pinhole being associated with a detector D1, D2, D3, D4. In accordance with some embodiments, the reflecting pinhole includes a reflective surface having a pinhole opening that allows a portion of light from the detection beam B2 that is directed at the reflecting pinhole to pass through the reflecting pinhole and be measured by the detector. The pinhole opening can include a physical hole that is made in the reflective material that forms the reflecting pinhole or the pinhole opening can include an optically transparent portion that allows a portion of light from the detection beam B2 that is directed at the reflecting pinhole to pass through the pinhole opening. In accordance with some embodiments, the reflecting pinhole includes a transmitting surface having a pinhole area that allows a portion of light from the detection beam B2 that is directed at the reflecting pinhole to reflect from the reflecting pinhole and be measured by the detector. The pinhole area is made in the reflective material that forms the reflecting pinhole such that it allows a portion of light from the detection beam B2 that is directed at the reflecting pinhole to reflect from the pinhole area. The detector D1, D2, D3, D4 can be any detector of electromagnetic radiation as may be appropriate for the application. Preferably, the detector is sensitive to the specific frequency or frequency range that corresponds to the detection beam. In some embodiments, the detector can be single pixel optical detector (e.g., a photo multiplier tube, a silicon photo multiplier, an avalanche photo diode or a photo diode based detector) that produces a signal that is function of the light intensity received by the detector. In some embodiments, the detector $D_L$ can include more than one pixel (e.g. a CCD or sCMOS line or frame camera) and in some embodiments each pixel can be sensitive to a different frequency or frequency range of light. In these embodiments, the signals from each pixel can be combined (e.g., by averaging or weighted averaging). Typically, each detector produces one or more digital signal values representative of the signal intensity as well as the frequency. The signal values can be transmitted to a computer system as they are generated and the computer system can use the signal values to construct an image of the sample. Due to the configuration of the Multi-Z confocal microscopy system according to the invention, each detector can be positioned to capture a detection signal emanating from a different depth or probe volume in the sample, enabling simultaneous imaging of multiple depths within the sample.

In accordance with some embodiments of the invention, the sample can be placed on a motorized stage and the sample can be moved with respect to the illumination line to scan the sample. In this embodiment, an X-Y scanning mechanism can be omitted as the scanning is performed by moving the sample.

FIG. 5 shows an alternative configuration of the reflecting pinholes RP1, RP2, RP3, RP4 and corresponding detectors D1, D2, D3, D4 to the configuration shown in FIG. 1. The portion of the detection beam B2 that is reflected by the first reflecting pinhole RP1 is reflected at mirror Md which is configured and arranged to reflect the remainder of the detection beam B1 to the next successive reflecting pinhole RP2. Similarly, the portion of the detection beam B2 that is reflected by the second reflecting pinhole RP2 is reflected at mirror Md which is configured and arranged to reflect the remainder of the detection beam B1 to the next successive reflecting pinhole RP3 and so-on down the line of reflecting pinholes. The distance between the reflecting pinholes can be selected to correspond to the signal probe volumes at different depths in the sample.

FIG. 6 shows an alternative configuration of the reflective slits $RS_1$, $RS_2$, $RS_3$, $RS_4$ and corresponding line camera detectors $LC_1$, $LC_2$, $LC_3$, and $LC_4$ to the configuration shown in FIG. 2. This configuration of the detection subsystem can be used with the Multi-Z line scan confocal microscopy system according to some embodiments of the invention. The portion of the detection beam $B_2$ that is reflected by the first reflective slit $RS_1$ is reflected to the second or next successive reflective slit $RS_2$. Similarly, the portion of the detection beam $B_2$ that is reflected by the second reflective slit $RP_2$ is reflected to the third or next successive reflective slit $RS_3$ and so-on down the line of reflective slits. The distance between the slits can be selected to correspond to the signal probe volumes at different depths in the sample.

FIG. 7 shows an alternative configuration of the reflective slits $RS_1$, $RS_2$, $RS_3$, $RS_4$ and corresponding line camera detectors $LC_1$, $LC_2$, $LC_3$, and $LC_4$ to the configuration shown in FIGS. 2 and 6. This configuration of the detection subsystem can be used with the Multi-Z line scan confocal microscopy system according to some embodiments of the invention. The portion of the detection beam $B_2$ that is reflected by the first reflective slit $RS_1$ is reflected at mirror Md which is configured and arranged to reflect the remainder of the detection beam $B_1$ to the second or next successive reflective slit $RS_2$. Similarly, the portion of the detection beam $B_2$ that is reflected by the second reflective slit $RS_2$ is reflected at mirror Md which is configured and arranged to reflect the remainder of the detection beam $B_1$ to the third or next successive reflective slit $RS_3$ and so-on down the line of reflective slits. The distance between the reflective slits can be selected to correspond to the signal probe volumes at different depths in the sample.

FIG. 8 shows an alternative configuration of the reflective slits $RS_1$, $RS_2$, $RS_3$, $RS_4$ and corresponding line camera detectors $LC_1$, $LC_2$, $LC_3$, and $LC_4$ to the configuration shown in FIGS. 2, 6 and 7. This configuration of the detection subsystem can be used with the Multi-Z line scan confocal microscopy system according to some embodiments of the invention. The portion of the detection beam $B_2$ that is reflected by the first reflective slit $RS_1$ is reflected at mirror $M_2$ which is configured and arranged to reflect the remainder of the detection beam $B_1$ to the second or next successive reflective slit $RS_2$. Similarly, the portion of the detection beam $B_2$ that is reflected by the second reflective slit $RS_2$ is reflected at mirror $M_3$ which is configured and arranged to reflect the remainder of the detection beam $B_1$ to the third or next successive reflective slit $RS_3$ and so-on down the line of reflective slits. In this configuration, the portion of the detection beam passing through the slit opening of each reflective slit is focused by lens fd on a set of line cameras $LC_1$, $LC_2$, $LC_3$, and $LC_4$ or a fast frame camera FC.

Figure 9:
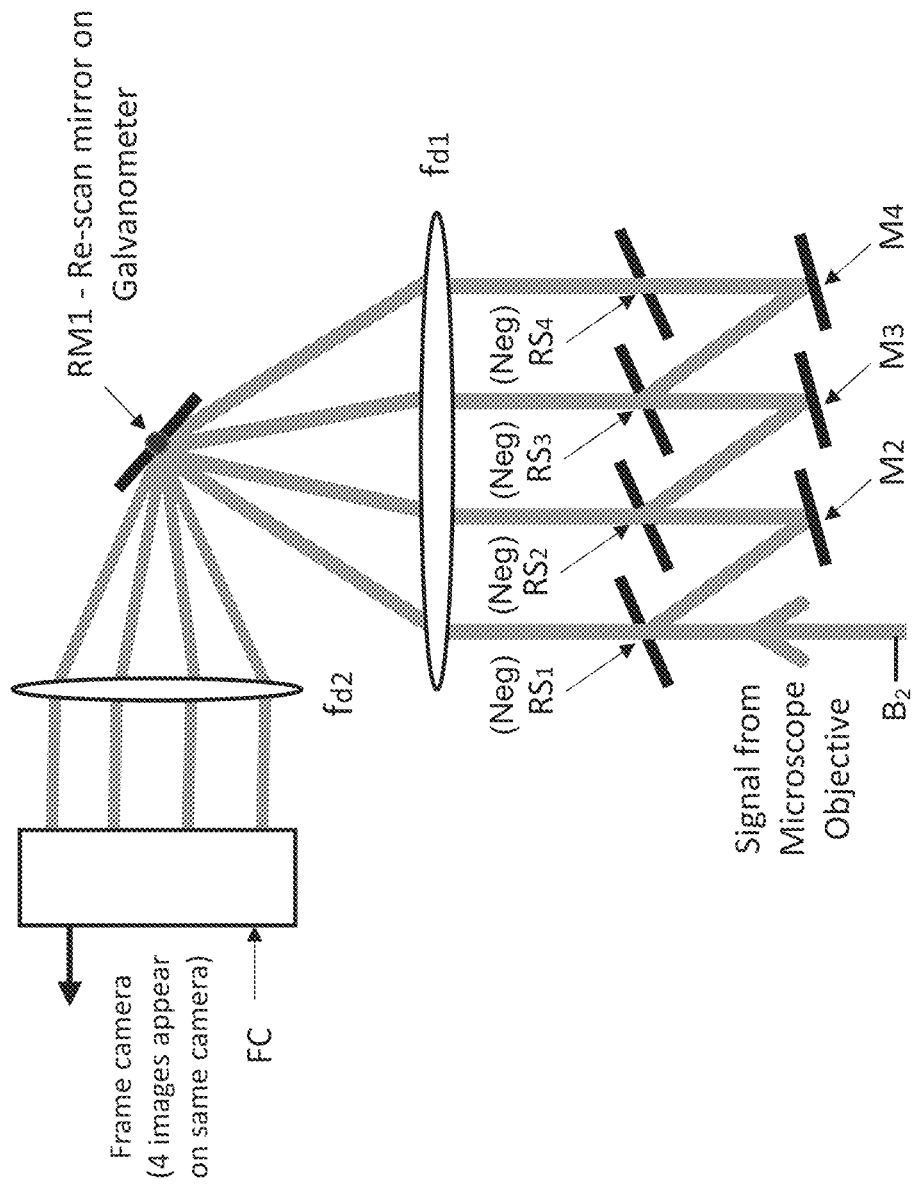
FIG. 9 shows a diagrammatic view of a detector system according to some embodiments of the invention.

FIG. 9 shows an alternative configuration of the reflective slits RS1, RS2, RS3, RS4 and corresponding line camera detectors LC1, LC2, LC3, and LC4 to the configuration shown in FIG. 8. This configuration of the detection subsystem can be used with the Multi-Z line scan confocal microscopy system according to some embodiments of the invention. In this embodiment, the individual portions of the detection beam B2 are focused by lenses fd1 and fd2 onto a rescan galvanometric mirror RM1 which directs the individual images onto a frame camera FC which enables 4 or more images of different depths in the sample to be created at the same time.

Figure 10:
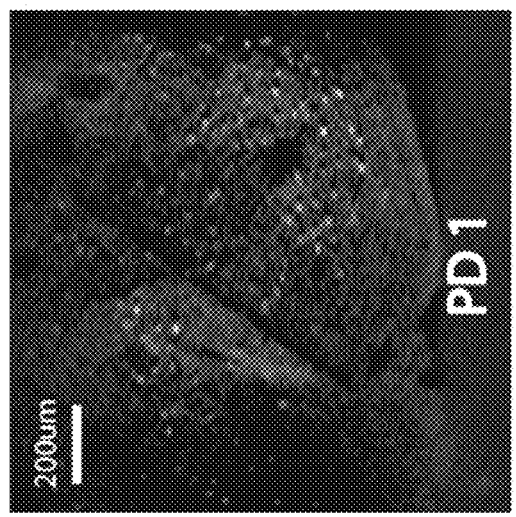
FIG. 10 shows an image of fluorescently labeled brain slices where each panel corresponds to one of four different depth acquired simultaneously by a Multi-Z confocal microscopy system according to some embodiments of the present invention.
Figure 10:
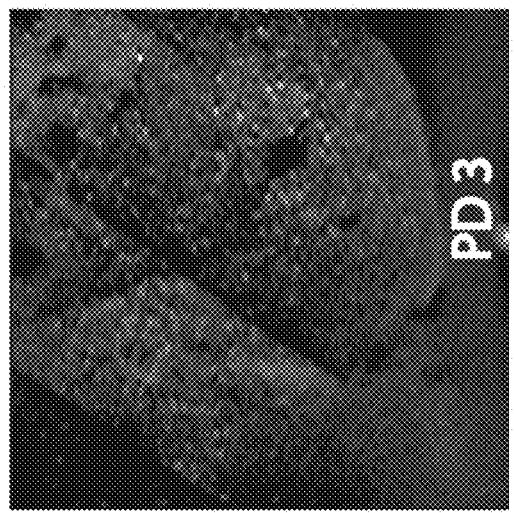
Figure 10:
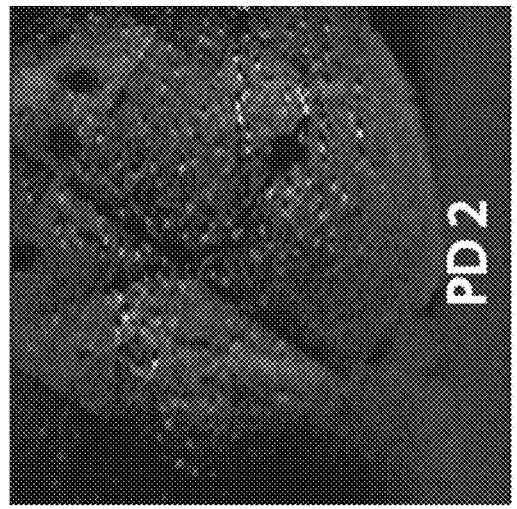
Figure 10:
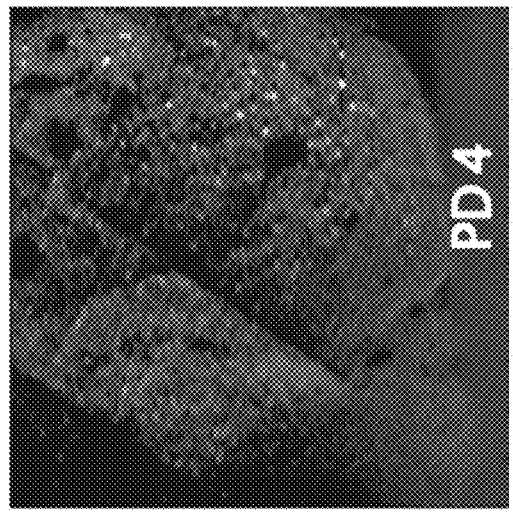
Figure 12A:
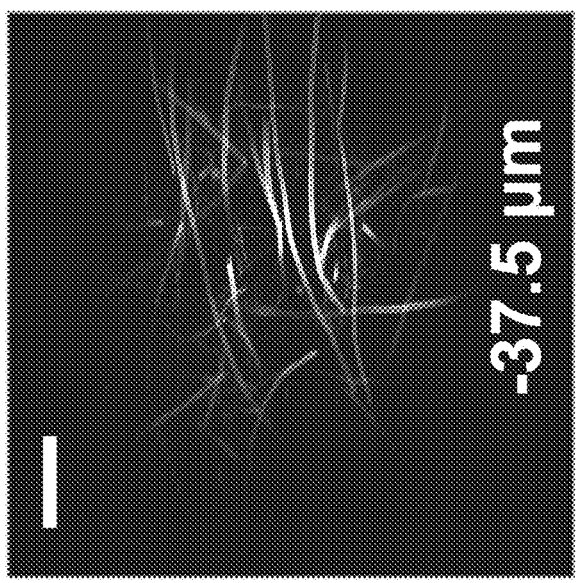
FIGS. 12A-12D show four simultaneously acquired images of a fixed sample of *Aspergillus* Conidiophores at four different imaging planes, according to some embodiments of the invention.
Figure 12B:
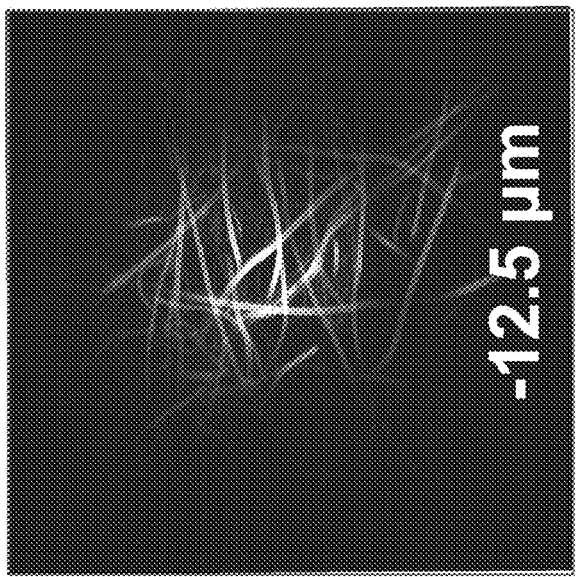
Figure 12C:
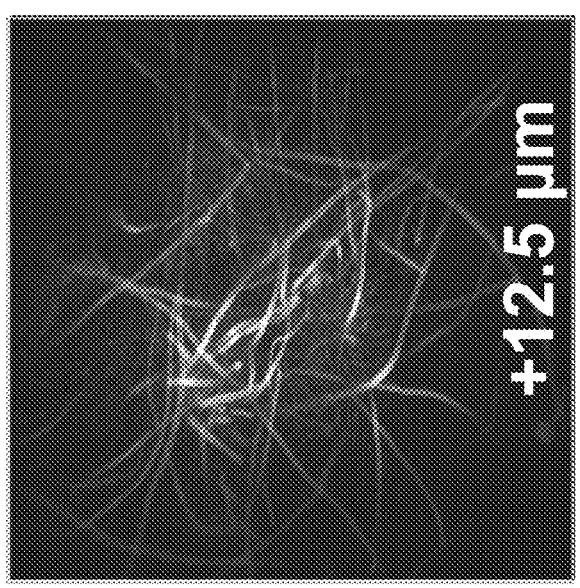
Figure 12D:
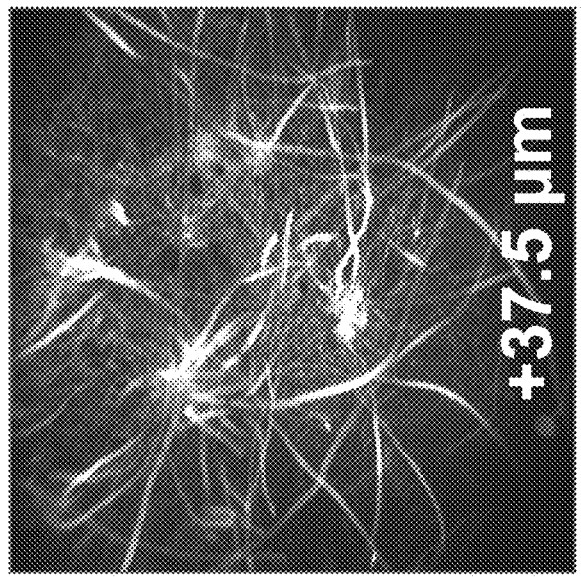

In accordance with some embodiments of the invention, the Multi-Z confocal microscopy system can be used in high speed volumetric imaging over large FOVs, for example, in performing large-scale functional brain imaging in preclinical models such as mice. FIG. 10 shows the results obtained by imaging fluorescently labeled brain tissue, showing images from four different depths acquired simultaneously. In other embodiments, genetically encoded calcium reporters such as GCaMP or RCaMP can be used to fluorescently label portions of the brain. These calcium reporters require blue or orange laser excitation (e.g. 488 nm and 561 nm), thus the Multi-Z confocal microscopy system can be configured with blue or orange laser (e.g. 488 nm and 561 nm) illumination sources. These indicators respond fast enough that video rate imaging can be accomplished. In accordance with some embodiments of the invention, Voltage reporters can be used in even higher speed imaging applications, for example, based on Multi-Z line-scanning confocal microscopy system according to some embodiments of the invention. As one of ordinary skill would appreciate, other LASER wavelengths can also be used, depending on the application. In general, the redder the laser wavelength, the deeper the image penetration depth into scattering tissue. In accordance with some embodiments of the invention, specialty dichromatic mirrors (e.g., beamsplitters) and emission filters can be incorporated in the microscope to allow more than one laser to be switched on in rapid succession to enable simultaneous imaging of differently labeled features of the target tissue.

To evaluate the resolution of a microscope according to some embodiments of the invention, sub-diffraction-sized beads were imaged, as shown in FIGS. 11A and 11C, over a 200 μm axial range about the Microscope Objective focal plane. The scale bar shown in FIGS. 11A and 11C is 5 μm. Using a 10× objective, the example system achieved for each detection channel a resolution of $\delta x=4.8$ μm (FIG. 11B) and $\delta z=15$ μm (FIG. 11D) in the transverse and axial dimensions, respectively. Note that this compromise in resolution was purposefully chosen to facilitate high-speed imaging over large FOVs. Such 3D resolution is easily adequate to resolve individual cells, such as neurons in brain tissue, while avoiding problems associated with oversampling and the unnecessary processing of massive amounts of data.

Using a system according to some embodiments of the invention, a fixed sample of *Aspergillus* Conidiophores, a common mold, was image. FIGS. 12A-12D show the four simultaneously acquired images from the shallowest (z=−37.5 μm) to the deepest plane (z=+37.5 μm) and FIGS. 12B and 12D at intermediate depths (z=−12.5 μm and z=+12.5 μm). Different features and the branching of the hydrae are clearly visible in these images, demonstrating the simultaneous multiplane acquisition and optical sectioning capabilities of the microscopic imaging system according to some embodiments of the invention over a large FOV, here 1.2×1.2 mm².

Figure 13B:
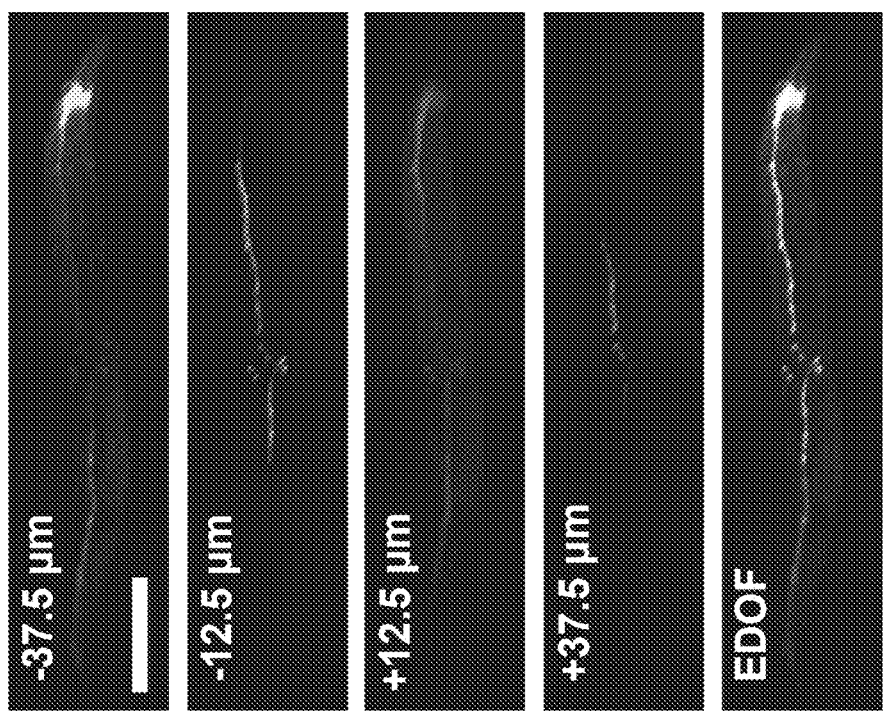
FIGS. 13A-13G show images of in-vivo volumetric imaging of *C. elegans* using a system according to some embodiments of the invention.
Figure 13A:
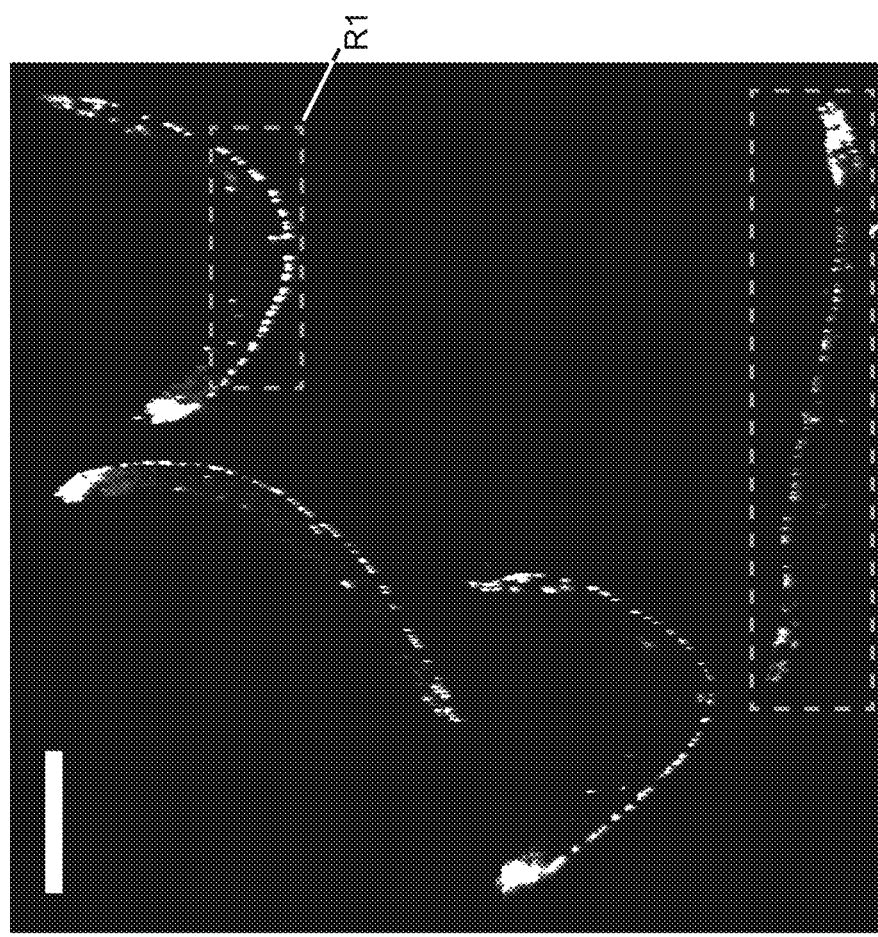
Figure 13C:
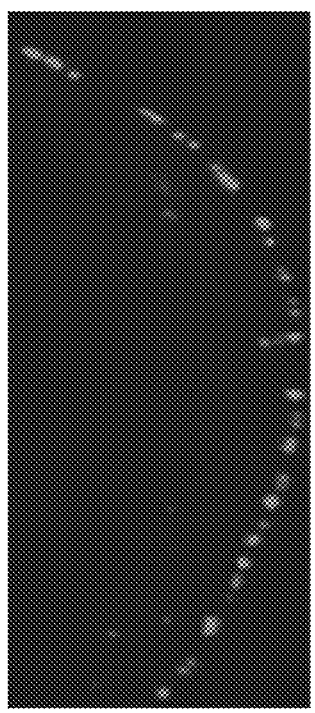
Figure 13D:
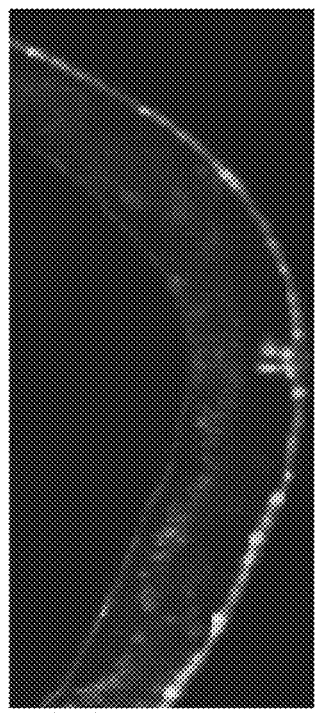
Figure 13E:
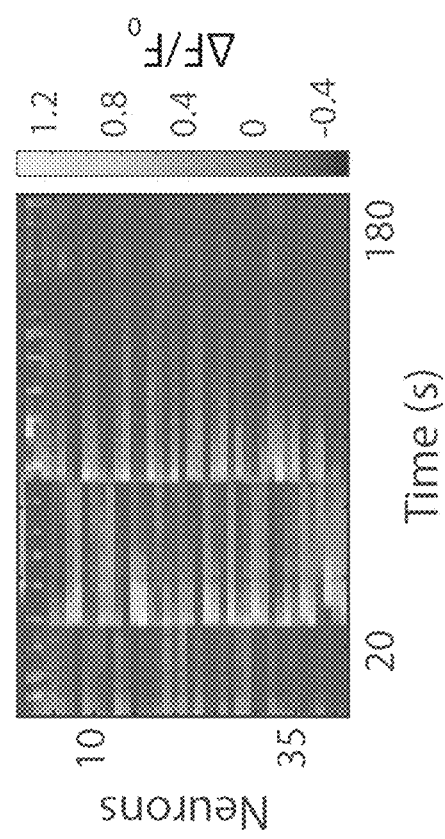
Figure 13G:
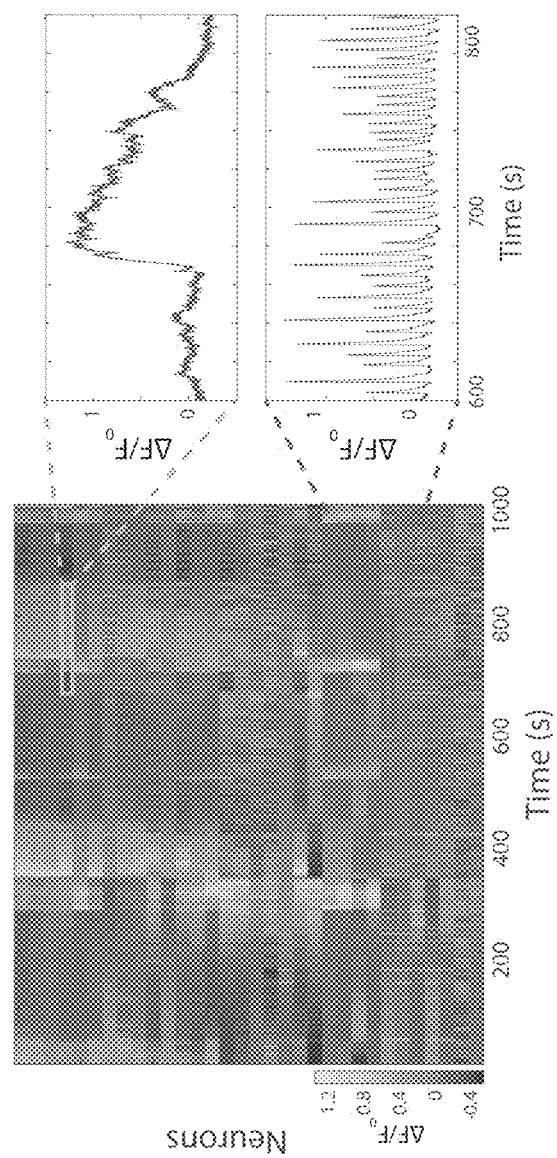

FIGS. 13A-13G show in vivo volumetric imaging of *Caenorhabditis elegans* as part of a whole animal study. We first performed imaging of *C. elegans* expressing both NLSmCherry, targeted to nuclei, and GCaMP6s. Adult worms are typically 500-800 μm long and 100 μm wide which makes them difficult to image entirely with a conventional confocal microscope. As a result, only young specimens or the head ganglia are usually imaged. However, the microscopic system according to some embodiments of the invention readily captured full 3D volumes of multiple worms embedded in agarose gel, here up to four as shown in FIG. 13A. Using two-color illumination and interleaved acquisition, the microscopic system according to some embodiments of the invention was able to simultaneously detect the neurons and monitor their activity. FIG. 13A shows the extended depth of field (EDOF) image of the nuclei obtained by summing the intensity of the four channels. Numerous neurons of the worms, from the densely packed head ganglia to the tail are visible. FIG. 13B shows the extended depth of field image showing the nuclei marked with NLSmCherry of four different worms in the FOV, where the scale bar is 200 µm. Since the calcium activity is simultaneously recorded, the active neurons can be spatiotemporally resolved in 4D as shown in FIG. 13B. FIG. 13C shows a closeup view of the nuclei (in red) of the upper blue rectangle $R_1$ of FIG. 13A. FIG. 13D shows a closeup view of the neurons displaying activity (in green) of the upper blue rectangle, $R_1$ of FIG. 13A. Such a rendering would not be possible with conventional confocal microscopy, which is limited to single-plane imaging over typically much smaller FOVs. Moreover, the systems according to the present invention can perform volumetric imaging of moving specimens. Because of the agarose gel, the worm was constrained to rotations only but the invention can be used to image freely moving worms as well. From the same acquisition, the $Ca^{2+}$ activity of the 42 detected ventral neurons of a selected worm (upper blue dashed rectangle $R_1$) was monitored at 7.5 Hz for 200 s as shown in FIG. 13D. The corresponding $Ca^{2+}$ traces are shown in FIG. 13E, where different subsets of neurons reveal clearly correlated and anti-correlated activity associated to forward and backward motion, in agreement with previous observations.

Figure 13F:
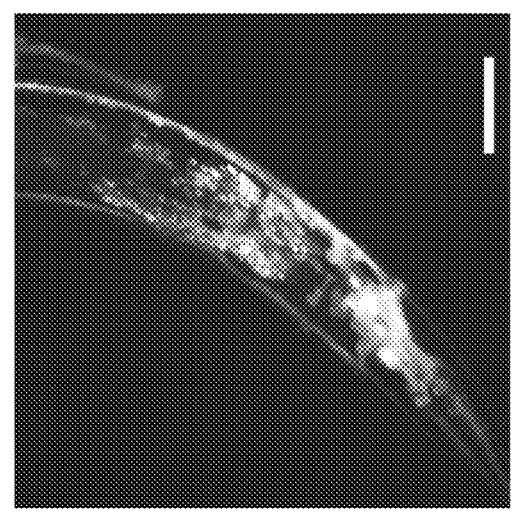

To image densely packed regions such as head ganglia, a higher transverse resolution is preferable. This could be obtained while maintaining the same distance $\Delta z$ between imaging planes by simply switching the Microscope Objective (20×) and two relay lenses to maintain a constant M. In this new configuration, the system can image the head ganglion of a worm (zoomed to 300×300×100 µm³) at 30 Hz. FIG. 13F shows an overlay of the temporal standard deviation of the Ca2+ signals in the head ganglion, where color corresponds to depth. Neurons from different depths are clearly distinguishable in this densely populated region. Note that due to internal motion, the worm intestine is also highlighted when we compute the standard deviation. In total, 32 neurons are identified over a duration of 1000 s, and their $Ca^{2+}$ traces are presented as a heat map in FIG. 13G. The acquisition speed of this embodiment of the invention was amply sufficient to record even the fastest $Ca^{2+}$ dynamics.

More challenging is the demonstration of in vivo neuronal imaging in mammalian brains. In this example, a system according to the present invention was used to perform Ca' imaging in a mouse brain expressing GCaMP6f, requiring both fast imaging, at least 15 Hz, and optical sectioning to reject extraneously scattered light. The system was focused in particular on the hippocampus, a subcortical region of the brain. During imaging, the mice were awake, head-fixed and no sensory stimulus was applied.

Figure 14B:
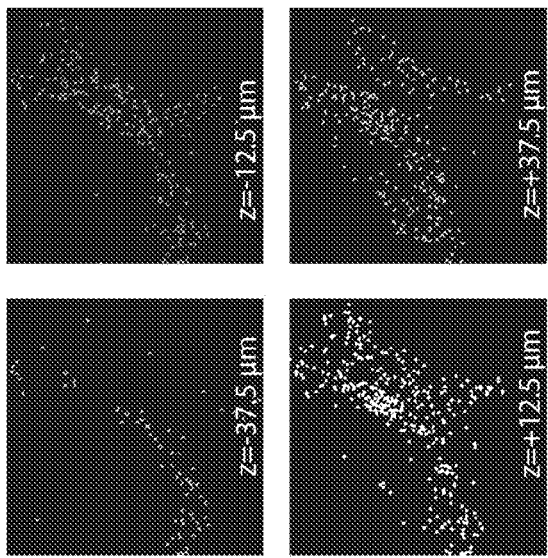
FIGS. 14A-14D show video-rate volumetric $Ca^{2+}$ imaging of a mouse brain expressing GCaMP6f, using a system according to some embodiments of the invention.
Figure 14D:
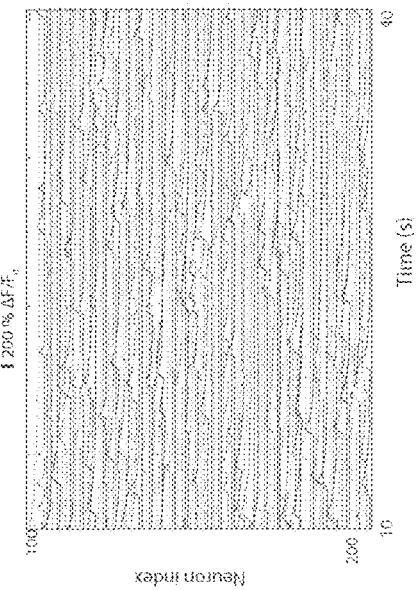
Figure 14A:
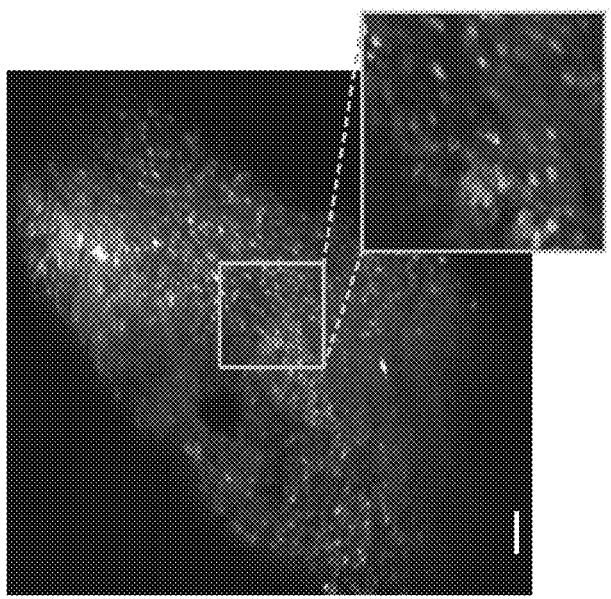
Figure 14C:
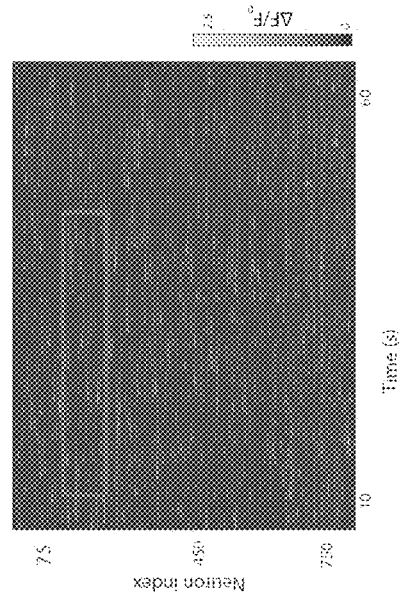

In this example, the spontaneous Ca2+ activity of neurons within a 1200×1200×100 µm³ volume were recorded at 30 Hz, the fastest rate currently achievable with this sample system for this FOV. Though the labelling was confined to an area smaller than the FOV, the EDOF images (i.e. z projections) reveal a large population of neurons as shown in FIG. 14A. Higher resolution images of smaller regions of interest were also obtained by reducing the FOV while keeping the same acquisition speed and number of pixels, allowing the details of individual cells to become clearer as shown in the inset of FIG. 14A. The benefits of simultaneous, multiplane acquisition are apparent in FIG. 14B, where different neurons are revealed in different imaging planes. Using a constrained non-negative matrix factorization algorithm (CNMF), 90, 264, 312 and 260 neurons were separately identified in each plane, from deepest to shallowest respectively, resulting in a total number of 926 neurons. Owing to the intentional partial overlap of the image planes (see FIG. 14D), some of these identifications are expected to be redundant. Indeed, similar processing applied to the EDOF images pared back these identifications to a total of 826 independent neurons, indicating that the overlap-induced crosstalk was approximately 12% (FIG. 14A). The corresponding extracted $Ca^{2+}$ traces, recorded over 66 s, are shown in FIGS. 14C and 14D for a magnified view. These results illustrate the capacity of systems according to the present invention to provide adequate SNR for neuronal segmentation in large, relatively dense, populations at video-rate timescales.

Figure 15B:
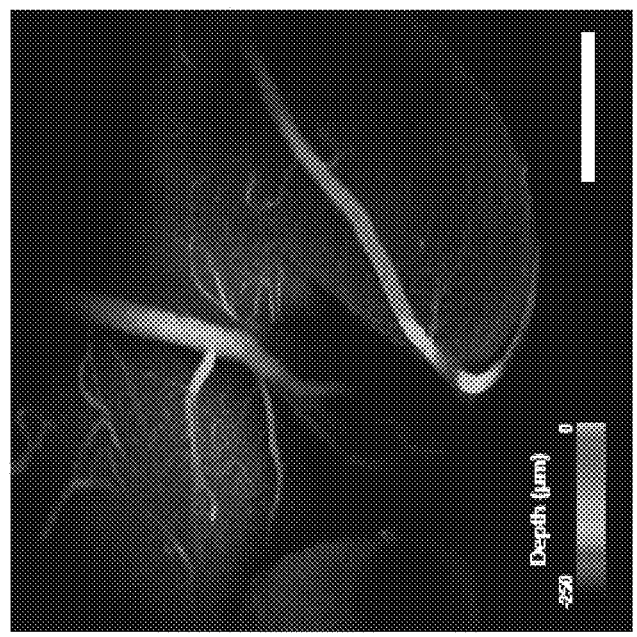
FIGS. 15A-15B show a system for augmented volumetric imaging using an electrically tunable lens controlled by a square-wave voltage and resulting images of fixed mouse brain vascular structures color coded by depth.
Figure 15A:
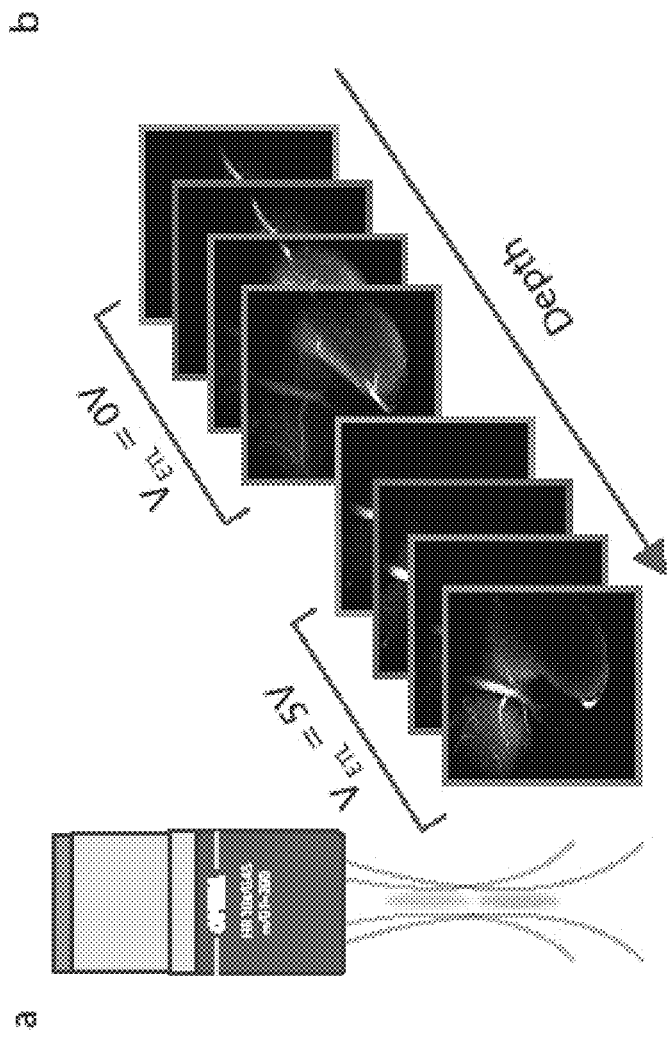

FIGS. 15A and 15B show an augmented volumetric imaging system according to some embodiments of the invention wherein an electrically tunable microscope objective lens is used. The tunable lens can be controlled by a square-wave voltage VET L to produce multi-Z images. FIG. 15A shows multi-Z images obtained for $V_{ETL}$=0V (4 images) and VET L=5V (4 images) corresponding to a focal shift of 150 µm. FIG. 15B shows the resulting volumetric acquisition of fixed mouse brain vasculature with structures color-coded by depth. The scale bar is 300 µm.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A multi-Z confocal imaging system comprising:
   a LASER illumination source configured to direct a single monochromatic illumination beam through a microscope objective along a Z axis at a sample, and wherein the single monochromatic illumination beam under fills an aperture of the microscope objective and the microscope objective focuses the single monochromatic illumination beam into a monochromatic illumination line extending along the Z axis into a predefined target area of the sample; and
   a scanning mechanism including at least one mirror configured to scan the monochromatic illumination line over the sample whereby a detection signal emanates from the sample through the microscope objective and the detection signal is formed into a detection beam directed toward a detection subsystem;
   wherein the detection subsystem includes a first reflecting pinhole positioned at a predefined location with respect to the detection beam such that a first portion of the detection beam is captured by the first reflecting pinhole and is detected by a first optical detector and any remaining portion of the detection beam passes to a second reflecting pinhole positioned at a predefined location with respect to the first reflecting pinhole and a second portion of the detection beam is captured by the second reflecting pinhole and is detected by a second optical detector; and wherein the first optical detector outputs a first signal representative of an image from a first depth along the Z axis in the sample at the predefined target area at substantially the same time as the second optical detector outputs a second signal representative of an image from a second depth along the Z axis in the sample at the predefined target area that is different from the first depth along the Z axis in the sample.

2. The imaging system according to claim 1 wherein the scanning mechanism is configured to scan the single monochromatic illumination line along an X axis and along a Y axis, wherein each of the X axis and the Y axis is substantially perpendicular to the Z axis.

3. The imaging system according to claim 1 wherein the second reflecting pinhole is configured such that any remaining portion of the detection beam not captured by the second reflecting pinhole passes to a third reflecting pinhole positioned at a predefined location with respect to the second reflecting pinhole and the third reflecting pinhole is positioned such that a third portion of the detection beam is captured by the third reflecting pinhole and is detected by a third optical detector; and wherein the third optical detector outputs a third signal representative of an image from a third depth along the Z axis in the sample that is different from the first depth and the second depth along the Z axis in the sample.

4. The imaging system according to claim 3 further comprising one or more reflecting pinholes, each reflecting pinhole positioned at a predefined location with respect to the third reflecting pinhole to receive a portion of the detection beam not captured by the third reflecting pinhole whereby a portion of the detection beam is captured by each reflecting pinhole and detected by an associated optical detector; and wherein the associated optical detector outputs a signal representative of an image from a depth along the Z axis in the sample according to the predefined location of each reflecting pinhole with respect to the third reflecting pinhole.

5. The imaging system according to claim 1 further comprising at least one focusing lens configured and arranged in a path followed by the detection beam between the scanning mechanism and the detection subsystem to change a magnification of the detection beam focused on the first reflecting pinhole.

6. The imaging system according to claim 1 wherein at least one of the first optical detector and the second optical detector includes at least one of a photo multiplier tube, a silicon photo multiplier, an avalanche photo diode or a photo diode based detector.

7. The imaging system according to claim 1 wherein the single monochromatic illumination beam under fills the aperture of the microscope objective by an amount in a range from 0.5% to 65%.

8. The imaging system according to claim 1 wherein the first reflecting pinhole sends the remaining portion of the detection beam directly to the second reflecting pinhole.

9. The imaging system according to claim 1 wherein the first reflecting pinhole sends the remaining portion of the detection beam toward a mirror which reflects the remaining portion of the detection beam to the second reflecting pinhole.

10. The imaging system according to claim 1 wherein at least one of the first reflecting pinhole and the second reflecting pinhole is a negative reflecting pinhole.

11. The imaging system according to claim 1 wherein at least one of the first reflecting pinhole and the second reflecting pinhole is a positive reflecting pinhole.

12. A multi-Z line-scanning confocal imaging system comprising:
a LASER illumination source configured to direct a single monochromatic illumination beam through a microscope objective along a Z axis at a sample, and wherein the single monochromatic illumination beam is expanded extending along a first axis relative to the Z axis and wherein the illumination beam under fills an aperture of the microscope objective and the microscope objective focuses the single monochromatic illumination beam into a monochromatic illumination sheet extending along the Z axis and the first axis into a predefined target area of the sample; and
a scanning mechanism including at least one mirror configured to scan the monochromatic illumination sheet over the sample along a second axis relative to the Z axis whereby a detection signal emanates from the sample through the microscope objective and the detection signal is formed into a detection beam directed toward a detection subsystem;
wherein the detection subsystem includes a first reflecting slit positioned at a predefined location with respect to the detection beam such that a first portion of the detection beam is captured by the first reflecting slit and is detected by a first optical detector and any remaining portion of the detection beam passes to a second reflecting slit positioned at a predefined location with respect to the first reflecting slit and a second portion of the detection beam is captured by the second reflecting slit and is detected by a second optical detector; and wherein the first optical detector outputs a first signal representative of an image from a first depth along the Z axis in the sample at the predefined target area at substantially the same time as the second optical detector outputs a second signal representative of an image from a second depth along the Z axis in the sample at the predefined target area that is different from the first depth along the Z axis in the sample at the predefined target area.

13. The imaging system according to claim 12 wherein the first axis corresponds to an X axis relative to the Z axis and the second axis corresponds to a Y axis relative to the Z axis; and wherein each of the X axis and the Y axis is substantially perpendicular to the Z axis.

14. The imaging system according to claim 12 wherein the first axis corresponds to an Y axis relative to the Z axis and the second axis corresponds to a X axis relative to the Z axis; and wherein each of the X axis and the Y axis is substantially perpendicular to the Z axis.

15. The imaging system according to claim 12 wherein the second reflecting slit is configured such that any remaining portion of the detection beam not captured by the second reflecting slit passes to a third reflecting slit positioned at a predefined location with respect to the second reflecting slit and the third reflecting slit is positioned such that a third portion of the detection beam is captured by the third reflecting slit and is detected by a third optical detector; and wherein the third optical detector outputs a third signal representative of an image from a third depth along the Z axis in the sample that is different from the first depth and the second depth along the Z axis in the sample.

16. The imaging system according to claim 15 further comprising one or more reflecting slits, each reflecting slit positioned at a predefined location with respect to the third reflecting slit to receive a portion of the detection beam not captured by the third reflecting slit whereby a portion of the detection beam is captured by each reflecting slit and detected by an associated optical detector; and wherein the associated optical detector outputs a signal representative of an image from a depth along the Z axis in the sample according to the predefined location of each reflecting slit with respect to the third reflecting slit.

17. The imaging system according to claim 12 further comprising at least one focusing lens configured and arranged in a path followed by the detection beam between the scanning mechanism and the detection subsystem to change a magnification of the detection beam focused on the first reflecting slit.

18. The imaging system according to claim 12 wherein at least one of the first optical detector and the second optical detector includes at least one of a line camera or frame camera based detector.

19. The imaging system according to claim 12 wherein the first reflecting slit sends the remaining portion of the detection beam directly to the second reflecting slit and each of the first optical detector and the second optical detector includes a line camera.

20. The imaging system according to claim 12 wherein the first reflecting slit sends the remaining portion of the detection beam toward a mirror which reflects the remaining portion of the detection beam to the second reflecting slit and each of the first optical detector and the second optical detector includes a line camera.

21. The imaging system according to claim 12 wherein the first reflecting slit sends the remaining portion of the detection beam toward a mirror which reflects the remaining portion of the detection beam to the second reflecting slit and each of the first optical detector and the second optical detector includes a separate portion of a frame camera.

22. The imaging system according to claim 12 wherein the detector subsystem includes a scanning mechanism including at least one mirror configured to scan each of the first portion of the detection beam and the second portion of the detection beam onto different portions of a frame camera.

23. The imaging system according to claim 12 wherein at least one of the first reflecting slit and the second reflecting slit is a negative reflecting slit.

24. The imaging system according to claim 12 wherein at least one of the first reflecting slit and the second reflecting slit is a positive reflecting slit.

* * * * *